(12) United States Patent
Ito et al.

(10) Patent No.: US 8,472,721 B2
(45) Date of Patent: Jun. 25, 2013

(54) PATTERN IDENTIFICATION UNIT GENERATION METHOD, INFORMATION PROCESSING APPARATUS, COMPUTER PROGRAM, AND STORAGE MEDIUM

(75) Inventors: Yoshinori Ito, Tokyo (JP); Masami Kato, Sagamihara (JP); Takahisa Yamamoto, Kawasaki (JP); Katsuhiko Mori, Kawasaki (JP); Osamu Nomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1142 days.

(21) Appl. No.: 12/330,514

(22) Filed: Dec. 9, 2008

(65) Prior Publication Data

US 2009/0157707 A1 Jun. 18, 2009

(30) Foreign Application Priority Data

Dec. 18, 2007 (JP) .................................. 2007-326585

(51) Int. Cl.
*G06K 9/00* (2006.01)
*G06K 9/62* (2006.01)

(52) U.S. Cl.
USPC .......................................... 382/181; 382/159

(58) Field of Classification Search
None
See application file for complete search history.

(56) References Cited

U.S. PATENT DOCUMENTS

| | | | |
|---|---|---|---|
| 4,661,913 A * | 4/1987 | Wu et al. .......................... 702/19 |
| 5,390,259 A * | 2/1995 | Withgott et al. .............. 382/173 |
| 5,508,823 A | 4/1996 | Kiyohara et al. |
| 5,819,247 A | 10/1998 | Freund et al. |
| 6,021,220 A * | 2/2000 | Anderholm .................... 382/194 |
| 6,081,620 A * | 6/2000 | Anderholm .................... 382/194 |
| 6,205,247 B1 * | 3/2001 | Breuer et al. .................. 382/228 |
| 6,272,479 B1 * | 8/2001 | Farry et al. ....................... 706/13 |
| 6,463,438 B1 * | 10/2002 | Veltri et al. ...................... 706/15 |
| 7,016,885 B1 * | 3/2006 | Mikhael et al. ................. 706/20 |
| 7,039,233 B2 | 5/2006 | Mori et al. |
| 7,197,180 B2 * | 3/2007 | Farmer .......................... 382/160 |
| 7,274,832 B2 * | 9/2007 | Nicponski ..................... 382/297 |
| 7,333,851 B2 * | 2/2008 | Echauz et al. ................. 600/544 |
| 7,369,687 B2 | 5/2008 | Kawato et al. |

(Continued)

FOREIGN PATENT DOCUMENTS

| | | |
|---|---|---|
| JP | 8-329031 | 12/1996 |
| JP | 2004-185611 | 7/2004 |
| JP | 2005-44330 | 2/2005 |
| JP | 2005-284487 | 10/2005 |

OTHER PUBLICATIONS

Viola et al., "Rapid Object Detection using a Boosted Cascade of Simple Features", Proc. IEEE Conf. on Computer Vision and Pattern Recognition, vol. 1, pp. 511-518, Dec. 2001.

(Continued)

*Primary Examiner* — Manav Seth
(74) *Attorney, Agent, or Firm* — Fitzpatrick, Cella, Harper & Scinto

(57) ABSTRACT

A pattern identification unit generation method of generating a pattern identification unit in which a weak discriminator array obtained by cascade-connecting a plurality of weak discriminators branches, and weak discriminator arrays are connected to respective arms after branching, evaluates based on a processing result obtained by inputting a set of evaluation data to the weak discriminator array whether or not a weak discriminator array after branching reaches the number of stages to be connected. The number of stages of weak discriminators to be connected without branching as the weak discriminator array is determined based on this evaluation result.

23 Claims, 26 Drawing Sheets

U.S. PATENT DOCUMENTS

| | | | |
|---|---|---|---|
| 7,379,568 B2 * | 5/2008 | Movellan et al. | 382/118 |
| 7,542,959 B2 * | 6/2009 | Barnhill et al. | 706/48 |
| 7,587,069 B2 * | 9/2009 | Movellan et al. | 382/118 |
| 2005/0213810 A1 | 9/2005 | Sabe et al. | |
| 2006/0074653 A1 | 4/2006 | Mitari et al. | |
| 2006/0115157 A1 | 6/2006 | Mori et al. | |
| 2006/0204053 A1 | 9/2006 | Mori et al. | |
| 2006/0228005 A1 | 10/2006 | Matsugu et al. | |
| 2007/0242856 A1 | 10/2007 | Suzuki et al. | |
| 2008/0106569 A1 | 5/2008 | Suwa et al. | |
| 2009/0089235 A1 | 4/2009 | Toni et al. | |

OTHER PUBLICATIONS

Huang et al., "Vector Boosting for Rotation Invariant Multi-View Face Detection", Tenth IEEE Int'l. Conf. on Computer Vision (ICCV2005), vol. 1, pp. 446-453, Oct. 17-21, 2005.

* cited by examiner

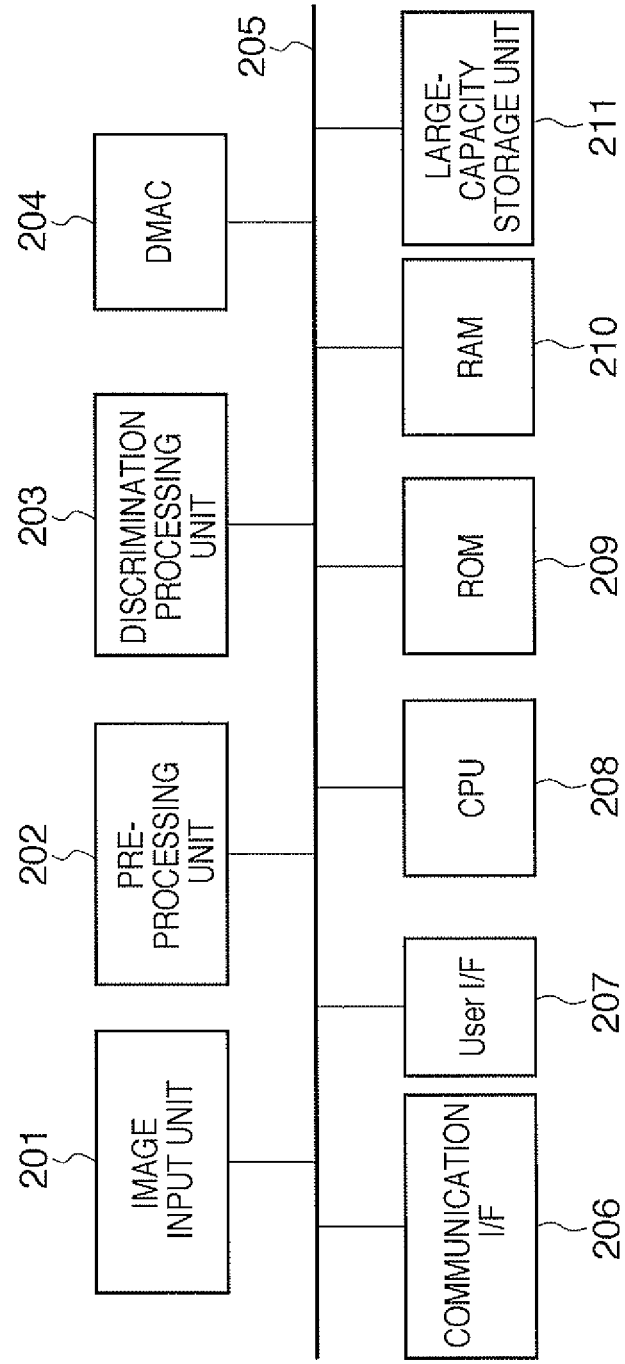

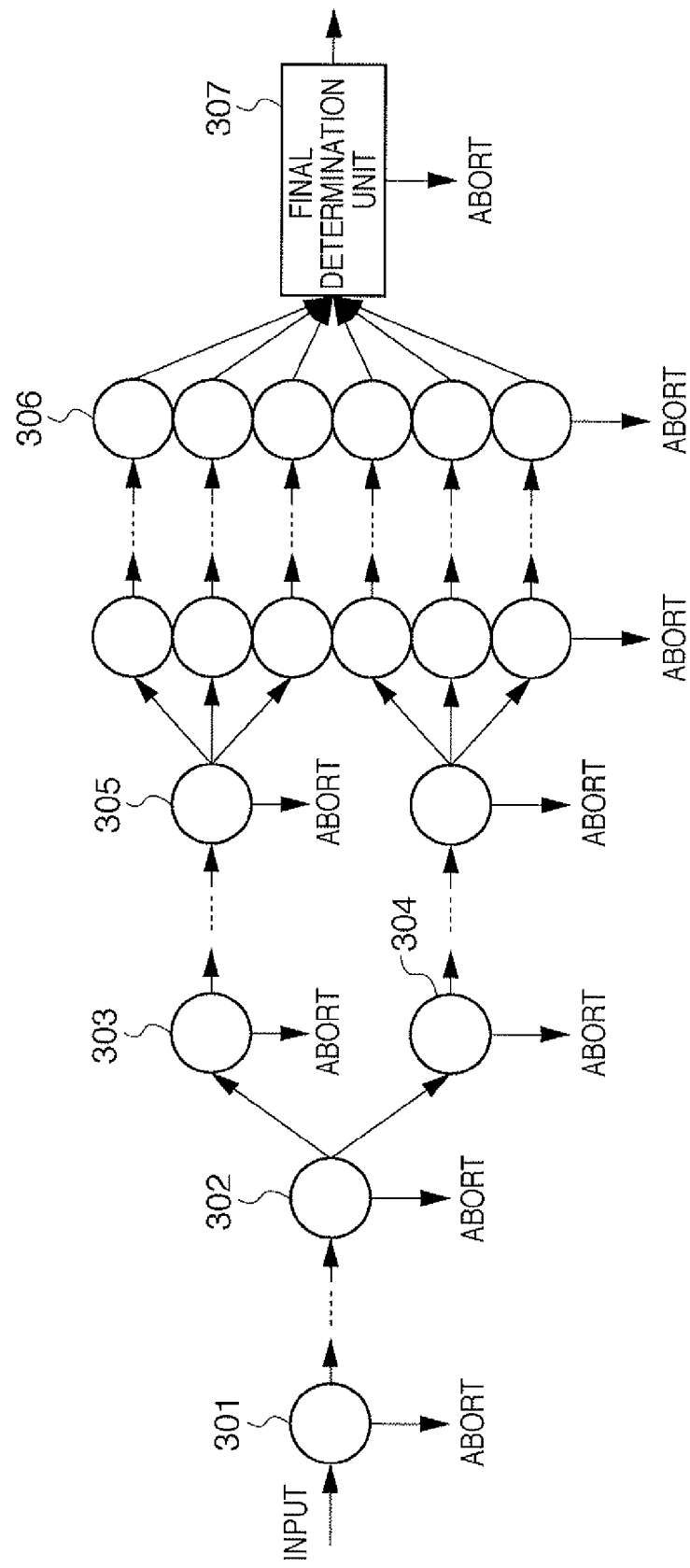

FIG. 5
IN-PLANE ROTATION × 3 DIVISIONS
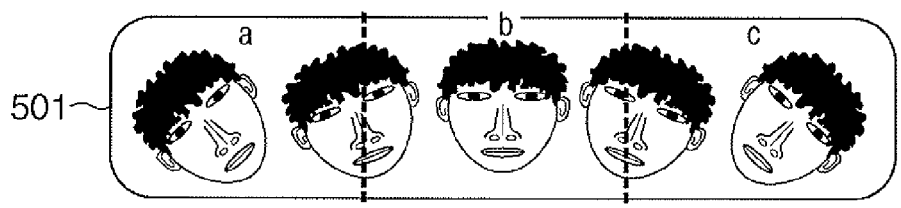
501
DEPTH ROTATION × 3 DIVISIONS
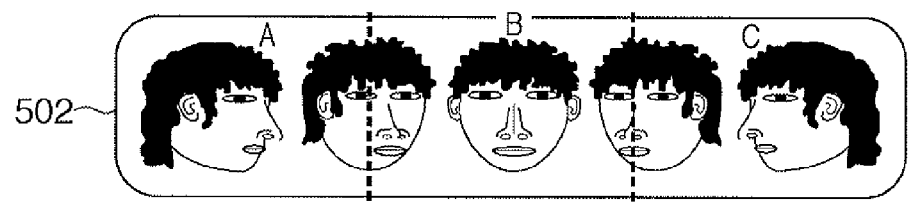
502
SIZE VARIATIONS × 2 DIVISIONS
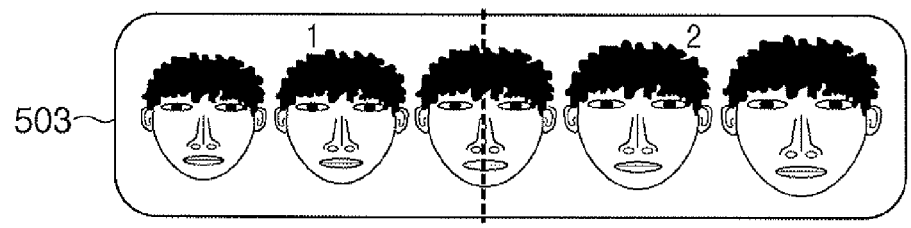
503

SUM TOTAL

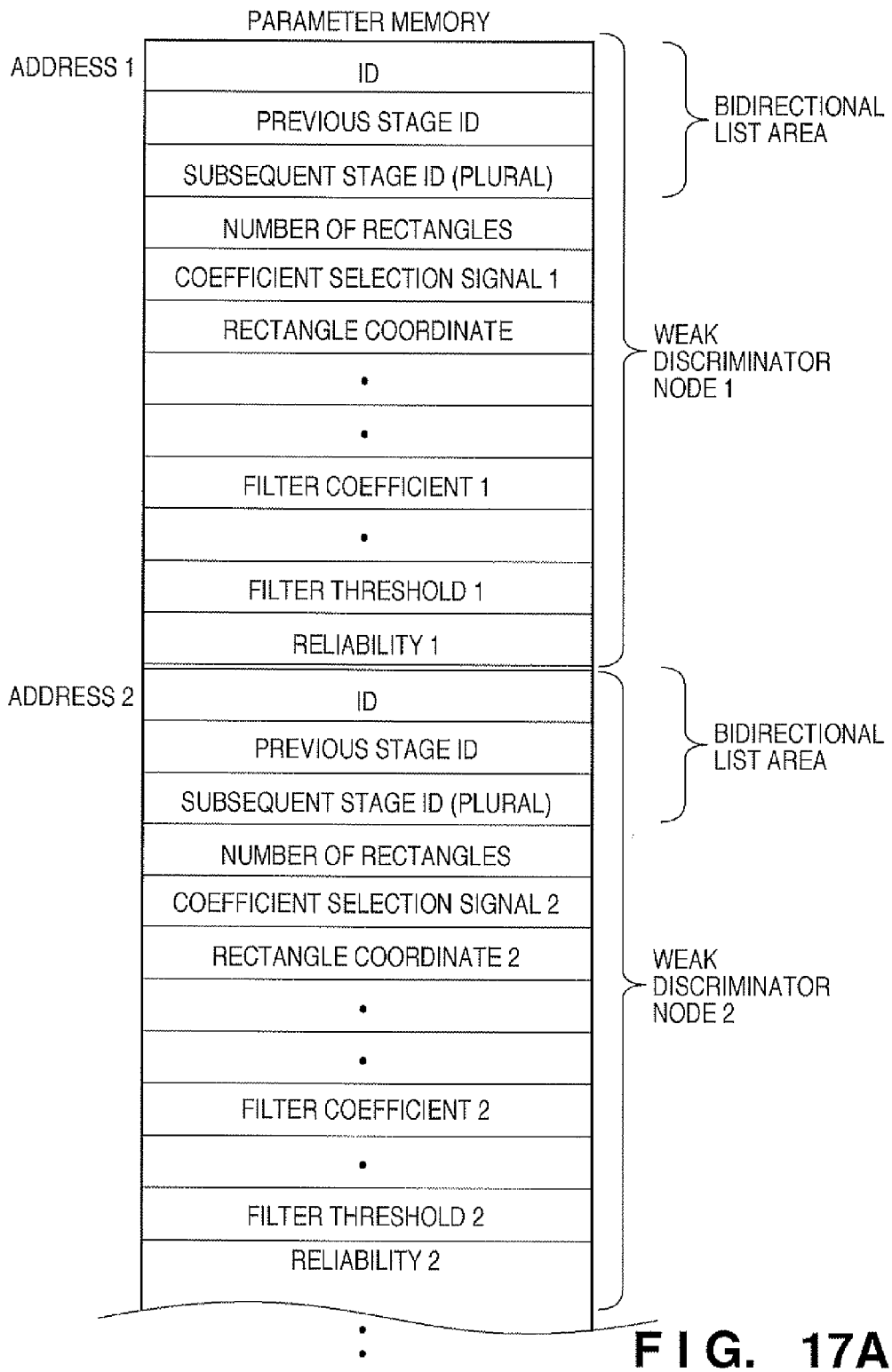
F I G. 17A

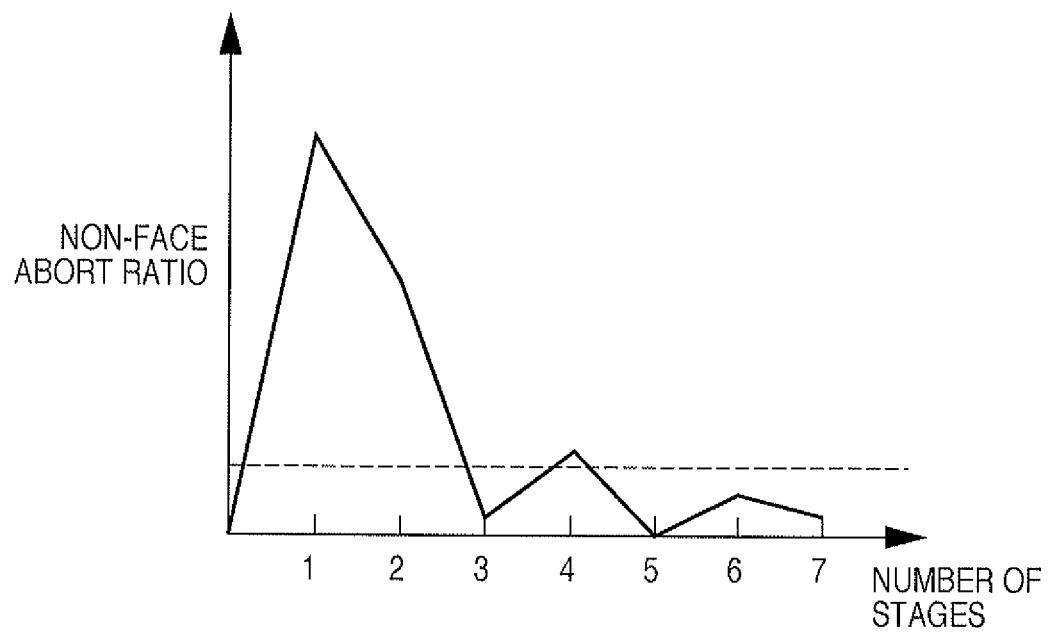
F I G. 24

PATTERN IDENTIFICATION UNIT GENERATION METHOD, INFORMATION PROCESSING APPARATUS, COMPUTER PROGRAM, AND STORAGE MEDIUM

BACKGROUND OF THE INVENTION

1. Field of the Invention

The present invention relates to a technique for identifying and extracting a specific data pattern included in image data, audio data, and the like.

2. Description of the Related Art

In recent years, in the field of pattern recognition, a method of configuring an identification unit by cascade-connecting weak discriminators, and executing processing for detecting a specific object such as a human face in an image and the like at high speed has received attention.

For example, in a method disclosed by Viola and Jones in P. Viola and M. Jones, "Rapid Object Detection using a Boosted Cascade of Simple Features", Proc. IEEE Conf. on Computer Vision and Pattern Recognition, Vol. 1, pp. 511-518, December 2001 (to be referred to as "non-patent reference 1" hereinafter), weak discriminators of the predetermined number, which extract rectangular features, are cascade-connected to configure a strong discriminator called a stage. This weak discriminator is generated by a boosting learning algorithm (disclosed in Japanese Patent Laid-Open No. 8-329031 and the like). Furthermore, a pattern identification unit with the configuration obtained by cascade-connecting a plurality of such stages has been proposed. By advancing processing while making abort determination (end of processing for a certain detection target position in an image) for each strong discriminator, since subsequent calculations for an input, which is determined early that it is not a detection target, are aborted, high-speed processing can be executed as a whole. This pattern identification method will be described in detail below.

The pattern identification unit of non-patent reference 1 moves a rectangular region (processing window 801) having a specific size within an image 800 to be processed, and checks if the processing window 801 at each moving destination includes a human face, as shown in FIG. 8.

FIG. 9 is a view showing the sequence of face detection processing executed in non-patent reference 1 in the processing window 801 at each moving destination position. The face detection processing in a certain processing window is executed using a plurality of stages. Weak discriminators of different combinations are assigned to the respective stages, and are processed by cascade connection to serve as strong discriminators. Each weak discriminator detects a so-called Haar-like feature, and comprises a combination of rectangular filters. As shown in FIG. 9, the numbers of weak discriminators assigned to the respective stages are different. Respective stages also have the cascade-connected configurations, and execute determination processing in an order they are connected. That is, in, for example, FIG. 9, the second stage executes the determination processing after the first stage, and the third stage then executes determination.

Each stage checks using weak discriminators of assigned patterns in turn if a processing window includes a human face. If it is determined in a certain stage that the processing window does not include any human face, the subsequent stages do not execute the determination processing for the processing window at that position. That is, the cascade processing is aborted. If it is determined in the final stage that a human face is included, determination that the processing window at that position includes a human face is settled.

The sequence of the face detection processing will be described in detail below with reference to the flowchart of FIG. 10.

In the face detection processing, the processing window 801 to be processed is allocated on a face detection target image 800 (step S1001). Basically, this processing window is comprehensively moved and selected by scanning from the end of the face detection target image 800 at predetermined intervals in turn in the vertical and horizontal directions, as shown in FIG. 8. For example, by raster-scanning the face detection target image 800, the processing window is selected.

The determination processing as to whether or not the selected processing window includes a human face is executed for that processing window. This determination processing is executed using a plurality of stages, as described above using FIG. 9. For this reason, a stage that executes the determination processing is selected in turn from the first stage (step S1002).

The selected stage executes the determination processing (step S1003). In the determination processing of this stage, if an accumulated score (to be described later) does not exceed a threshold determined in advance for each stage (NO in step S1004), it is determined that the processing window does not include any human face (step S1008), and the processes in step S1007 and subsequent steps are executed. The processes in step S1007 and subsequent steps will be described later.

On the other hand, if the accumulated score exceeds the threshold determined in advance for each stage (YES in step S1004), it is determined if that determination processing (that in step S1003) is executed by the final stage. If that determination processing is executed not by the final stage (NO in step S1005), the process returns to step S1002 to select the next stage, and to execute the determination processing by the newly selected stage. On the other hand, if the determination processing is executed by the final stage (YES in step S1005), it is finally determined that the current processing window includes a human face (step S1006). At this timing, it is determined that this processing window includes a human face.

It is then determined if the processing window that has undergone the determination processing is a last processing window in the face detection target image. If the processing window is not the last processing window (NO in step S1007), the process returns to step S1001 to select the next processing window and to execute the processes in step S1002 and subsequent steps. On the other hand, if the processing window is the last processing window, the face detection processing for this input image as a face detection target ends.

The processing contents of determination in each stage will be described below.

Weak discriminators of one or more patterns are assigned to each stage. This assignment is executed by an ensemble learning algorithm such as AdaBoost or the like in learning processing. Each stage determines based on the weak discriminators of patterns assigned to itself if the processing window includes a face.

In each stage, feature amounts in a plurality of rectangular regions in the processing window are calculated based on the weak discriminators of the patterns assigned to that stage. The feature amount used in this case is a value calculated using the sum total value of pixel values in each rectangular region (sum total value in a rectangular region) such as the total value, average value, and the like of the pixel values in the rectangular region. The sum total value in the rectangular region can be calculated at high speed using accumulated image information (called a Summed Area Table (SAT) or Integral Image) for an input image.

FIGS. 11A and 11B are views for explaining an example of the SAT. FIG. 11A shows an original input image 1101, and has the upper left corner as an origin (0,0). Letting I(x, y) be a pixel value at a coordinate position (x, y) of the input image 1101, a component C(x, y) at the same position (x, y) of the SAT is defined as:

$$C(x, y) = \sum_{\substack{x' \leq x \\ y' \leq y}} I(x', y') \quad (1)$$

As shown in FIG. 11B, the sum total value of pixels in a rectangle defined by the origin position (0,0) and a position (x, y) as diagonal positions on the input image 1101 is a value C(x, y) at the position (x, y). The sum of pixel values I (x, y) in an arbitrary rectangular region on the input image 1101 can be calculated with reference to four points shown in, for example, FIG. 12 using:

$$C(x_0, y_0; x_1, y_1) = C(x_0-1, y_0-1) - C(x_0-1, y_1) - C(x_1, y_0-1) + C(x_1, y_1) \quad (2)$$

As a relative value of the calculated feature amounts (for example, a ratio or difference value; assume that a difference value of feature amounts is calculated in this case), the difference value is calculated, and it is determined based on this difference value if the processing window includes a human face. More specifically, whether the calculated difference value is larger or smaller than a threshold set in a weak discriminator of a pattern used in determination is determined. According to this determination result, whether or not the processing window includes a human face is determined.

However, the determination at this time is made based on an individual weak discriminator of each pattern, but it is not the determination of the stage. In this manner, in each stage, the determination processes are individually executed based on the weak discriminators of all the assigned patterns, and the respective determination results are obtained.

Next, an accumulated score in that stage is calculated. Individual reliability weights (scores) are assigned to weak discriminators of respective patterns. The reliability weight is a fixed value indicating "probability of determination", that is, an individual reliability. If it is determined that the processing window includes a human face, a score assigned to the weak discriminator of the pattern used at that time is referred to, and is added to the accumulated score of the stage. In this way, the sum total of scores individually added is calculated as the accumulated score of that stage. That is, this accumulated score is a value indicating the probability of determination in that stage as a whole (whole stage reliability). If the whole stage reliability exceeds a predetermined threshold (whole stage reliability threshold), it is determined in this stage that the processing window is likely to include a human face, and the process is continued to advance to the next stage. On the other hand, if the whole stage reliability in this stage does not exceed the threshold, it is determined that the processing window does not include any human face, and the subsequent cascade processing is aborted.

In non-patent reference 1, high-speed pattern identification represented by face detection is implemented in such sequence. Note that a detector in FIGS. 9 and 10 can be used as a pattern identification unit for patterns other than faces if it has undergone appropriate learning in advance.

Japanese Patent Laid-Open No. 2004-185611 and Japanese Patent Laid-Open No. 2005-044330 have disclosed inventions associated with a pattern identification method and apparatus based on the idea of non-patent reference 1. A pattern identification unit having a structure in which such weak discriminators are cascade-connected in line exerts fast and sufficient identification performance upon separating a look-alike pattern (detection target pattern) and other patterns (non-detection target patterns) especially from an image.

However, when a detection target pattern is, for example, a face image, if a pattern inclines to the left or right through about several ten degrees (to be referred to as in-plane rotation hereinafter) although it is kept looking in a frontal direction, it is not a "look-alike" pattern with respect to an original erected frontal face. Furthermore, if a pattern is rotated in the axial direction (to be referred to as depth rotation or lateral depth rotation hereinafter) to be close to a side face, it becomes a quite different two-dimensional image pattern. It is primarily impossible to identify patterns with such large variations by the cascade connection in line, resulting in an increase in processing time and deterioration of detection precision. Since the cascade connection structure of weak discriminators aims at excluding little by little non-detection target patterns unlike a detection target pattern to be identified, use of look-alike patterns to be identified is premised.

In case of in-plane rotation alone, when an input image is input to an identification unit that detects a frontal face close to an erected image after it is sequentially rotated little by little, faces at every angles of 360° can be identified. However, with this method, the processing time increases according to the number of times of rotation, and that method cannot cope with depth rotation if it is applied.

Hence, Z. Zhang, L. Zhu, S. Z. Li, and H. Zhang, "Real-Time Multi-View Face Detection", Proceedings of the Fifth IEEE International Conference on Automatic Face and Gesture Recognition (FGR'02) (to be referred to as "non-patent reference 2" hereinafter), proposes an identification unit having a hierarchical pyramid structure based on the Coarse to Fine approach. With this identification unit, in the first hierarchy, learning image patterns including all face-view variations to be detected are input to learn one stage. In the second hierarchy, face-view variations are divided for respective predetermined ranges, and a plurality of stages are learned using learning image patterns including only variations within the divided ranges. In the next hierarchy, variations are further divided into narrower ranges, and a plurality of stages, the number of which is further increased, are learned. In this manner, the number of strong discriminators (stages) whose robustness is gradually lowered is gradually increased as the hierarchies progress, thus configuring a pyramid-like structure. Note that the identification unit in this reference supports rotation by dividing only face-view variations of lateral depth rotation. A full depth rotation range of ±90° is divided into three ranges in the second hierarchy, and is divided into nine ranges in the third hierarchy, but an in-plane rotation range is not divided.

In the detection processing of this identification unit, if an input sub-window has passed the stage of the first hierarchy, it executes respective stages of the second hierarchy in turn. If the sub-window has passed any one of the stages, it advances to the stages of the next hierarchy. In this manner, since the identification unit begins with coarse detection and then proceeds to detections with gradually higher precision levels, the identification unit that can detect face patterns of all variations with high precision is configured.

Japanese Patent Laid-Open No. 2005-284487 also discloses a method of configuring an identification unit having a tree structure which gradually branches from a detector with large robustness into those with lower robustness, based on the same idea. In this identification unit, one node (stage) of each arm of a tree is learned to cover a partial variation range obtained by dividing a variation range to be covered by a parent node. Face-view variations supported by an embodiment disclosed in Japanese Patent Laid-Open No. 2005-284487 include not only those of lateral depth rotation but also those of longitudinal depth rotation in which a face turns up or down from a frontal face. A person empirically determines the numbers of weak discriminator stages of respective nodes to execute learning.

In detection processing, after the detection processing of the first node including all longitudinal and lateral depth rotation variations is executed, the process branches to three variations, that is, a frontal face and depth-rotation faces in the right and left directions. In the next hierarchy, the process further branches into three different longitudinal depth rotation variation ranges. Only longitudinal rotation central variations of a frontal face further branch to three ranges in the next hierarchy. After such branch structure is determined in advance, many sample data corresponding to respective variations are input to make respective branches learn. Unlike in non-patent reference 2, since calculations of lower hierarchy nodes included in variations aborted at a higher hierarchy node need not be executed, high-speed processing can be implemented. Note that a weak discriminator in Japanese Patent Laid-Open No. 2005-284487 uses a pixel difference in place of a rectangular difference. However, the idea that a strong discriminator is configured by cascade-connecting weak discriminators remains the same.

C. Huang, H. Ai, Y. Li, and S. Lao, "Vector Boosting for Rotation Invariant Multi-View Face Detection", Tenth IEEE International Conference on Computer Vision (ICCV2005), Volume 1, 17-21 October 2005, pp 446-453 (to be referred to as "non-patent reference 3" hereinafter) proposes another learning method of an identification unit having a tree structure similar to Japanese Patent Laid-Open No. 2005-284487. Variations supported by the identification unit described in this reference include in-plane rotation and lateral depth rotation variations. This reference defines a structure in which lateral depth rotation variations are branched from a node of the first hierarchy into five ranges in two hierarchies, and after that, rotation variations are branched into three ranges in the fourth hierarchy. Making learning according to this structure is the same as the above reference. Also, a person empirically determines the numbers of weak discriminator stages of respective nodes to execute learning in the same manner as in the above reference.

However, outputs of discriminators of each node learned before the last branch is reached are not scalar values but a vector value having the number of elements equal to the number of branches of a hierarchy next to that node, unlike in the above reference. That is, each node detector before branching has not only a function of aborting a non-face image but also a function of making branch selection of the next hierarchy. Upon detection, since only branches corresponding to elements whose output vector value is close to 1 of each node are launched, unnecessary calculations need not be made, thus guaranteeing high-speed processing.

In the related arts such as non-patent references 2 and 3 and Japanese Patent Laid-Open No. 2005-284487, a division method (i.e., a branch structure) of variation ranges based on the Coarse to Fine approach or tree structure is determined prior to learning. The numbers of weak discriminator stages of respective divided nodes (stages) are the predetermined numbers of stages which empirically (or intuitively) are determined by a person who conducts machine learning processing. For example, Japanese Patent Laid-Open No. 2005-284487 determines that the number of weak discriminators of an arm node of each branch is 100. Also, non-patent reference 2 generates vector output weak discriminators one by one (i.e., of T stages) by repetitive processing of T times.

The number of weak discriminator stages which is, for example, empirically determined by a person is not always optimal. In the pattern identification unit having the branch structure (or pyramid structure), patterns to be identified have smaller robustness in nodes in later stages. Therefore, the number of processing stages (i.e., speed) and precision required to separate target patterns from other patterns such as a background and the like improve toward later stages. It is considered that the number of processing stages empirically determined in the related arts suffices to determine whether or not processing of a node of a subsequent stage starts, but it is not the minimum required number of processing stages. Since robustness becomes lower toward the later stages, it is expected to improve the processing speed when a node after the last branch is reached as early as possible. However, in the above related arts, there is no means for discriminating the minimum required number of processing stages in each branch node.

SUMMARY OF THE INVENTION

The present invention has been made to solve the aforementioned problems, and has as its object to provide a technique that can discriminate the minimum required number of processing stages in each branch upon learning a pattern identification unit with a branch structure.

According to one aspect of the present invention, there is provided a pattern identification unit generation method of generating a pattern identification unit in which a weak discriminator array obtained by cascade-connecting a plurality of weak discriminators branches, and weak discriminator arrays are connected to respective arms after branching, the method comprises:

an evaluation step of evaluating based on a processing result obtained by inputting a set of evaluation data to the weak discriminator array whether or not a weak discriminator array after branching reaches the number of stages to be connected;

a determination step of determining, based on an evaluation result in the evaluation step, the number of stages of weak discriminators to be connected without branching as the weak discriminator array after branching.

According to another aspect of the present invention, there is provided an information processing apparatus, which executes a pattern identification unit generation method of generating a pattern identification unit in which a weak discriminator array obtained by cascade-connecting a plurality of weak discriminators branches, and weak discriminator arrays are connected to respective arms after branching, the apparatus comprises:

an evaluation unit adapted to evaluate based on a processing result obtained by inputting a set of evaluation data to the weak discriminator array whether or not a weak discriminator array after branching reaches the number of stages to be connected;

a determination unit adapted to determining, based on an evaluation result of the evaluation unit, the number of stages of weak discriminators to be connected without branching as the weak discriminator array after branching.

According to the present invention, a pattern identification unit with a branch structure can be learned by discriminating the minimum required number of processing stages in each branch.

Further features of the present invention will become apparent from the following description of exemplary embodiments with reference to the attached drawings.

BRIEF DESCRIPTION OF THE DRAWINGS

FIG. 2 is a block diagram showing an example of the arrangement of an apparatus which executes the pattern identification unit generation method according to the preferred embodiment of the present invention;

FIGS. 3A and 3B are views for explaining the connection structures of nodes of a branch structure pattern identification unit generated by the pattern identification unit generation method according to the preferred embodiment of the present invention;

FIG. 5 is a view for explaining examples of variation categories of detection target data supported by the branch structure pattern identification unit according to the preferred embodiment of the present invention;

FIGS. 17A and 17B are views showing an example of the memory map of a parameter memory of the pattern identification unit according to the preferred embodiment of the present invention;

FIG. 24 is a graph showing an example of a change state of an abort ratio of non-face data for respective stages of weak discriminators.

DESCRIPTION OF THE EMBODIMENTS

Figure 1:
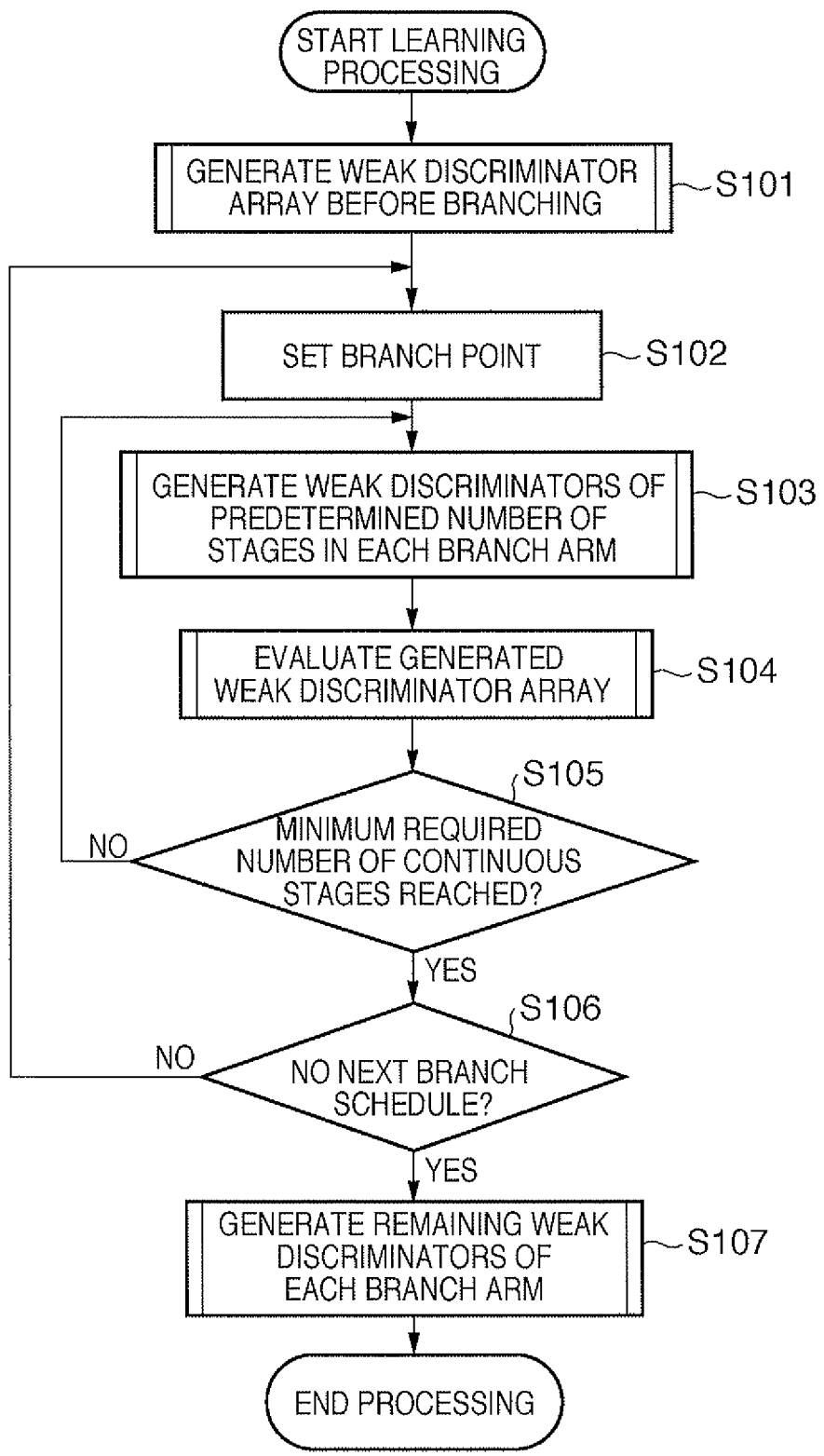
FIG. 1 is a flowchart for explaining learning processing in a pattern identification unit generation method according to a preferred embodiment of the present invention.

Preferred embodiments of the present invention will be exemplarily explained in detail hereinafter with reference to the accompanying drawings. However, components described in these embodiments are merely examples, and the technical scope of the present invention is settled by the scope of the claims and is not limited to the following individual embodiments.

(First Embodiment)
(Explanation of Block Diagram)

FIG. 2 is a block diagram showing the arrangement of an information processing apparatus according to an embodiment of the present invention. An image input unit 201 has a function of fetching input image data which are to undergo pattern identification processing, and learning sample image data into the apparatus. The image input unit 201 includes an image sensing device configured by, for example, an optical system, a photoelectric conversion device such as a CCD sensor or the like, a driver circuit, an AD converter, a signal processing circuit that executes various kinds of image processing, a frame buffer, and the like. Or the image input unit 201 includes an I/F device which shares hardware with a communication interface (I/F) 206 (to be described later), and receives image data from an external apparatus via a predetermined communication route such as a network or the like connected to the I/F.

A pre-processing unit 202 executes various kinds of pre-processing required to effectively implement detection processing. More specifically, the pre-processing unit 202 processes various kinds of image data conversion such as color conversion processing, contrast correction processing, generation of SAT (Summed Area Table) data, and the like using hardware. A discrimination processing unit 203 has a function of identifying the presence/absence of a predetermined object pattern with reference to the output from the pre-processing unit 202. The discrimination processing unit 203 executes boosting discrimination processing based on parameters generated by learning. Note that the functions (or some functions) of the pre-processing unit 202 and discrimination processing unit 203 can also be implemented as processing by software programs executed by a CPU 208 (to be described later).

A DMAC (Direct Memory Access Controller) 204 controls data transfer between respective processing units, and a RAM 210 and ROM 209 on a CPU bus 205 and the like.

The communication I/F 206 can receive instructions of predetermined operations from an external apparatus to this apparatus, and can transfer a data group required for learning from an external apparatus to a large-capacity storage unit 211 (to be described later).

A user interface (User I/F) 207 comprises input and output devices such as push button switches and a keyboard used by an operator to designate operations of the apparatus, a display panel used to present information to the operator, and the like.

The CPU (Central Processing Unit) 208 executes processing according to the present invention, and controls the operations of the respective unit of this apparatus as a whole connected via the CPU bus 205. The ROM 209 stores instructions that specify the operations of the CPU 208. The RAM 210 is used as a work memory required for the operations of the CPU 208. The RAM 210 comprises a memory having a relatively large capacity such as a DRAM (Dynamic RAM) or the like. The large-capacity storage unit 211 is a large-capacity data storage device such as a hard disk, flash memory, or the like. For example, a large-volume data set such as sample images and the like required for learning is stored in the large-capacity storage unit 211.

The information processing apparatus adopts an arrangement in which all the components are connected to the CPU bus 205, as shown in FIG. 2. In addition to this arrangement, for example, the image input unit 201, pre-processing unit 202, discrimination processing unit 203, and DMAC 204 may be connected to another bus (image bus), and the image bus and CPU bus may be connected via a bridge. By isolating the buses, the hardware processing units (image input unit 201, pre-processing unit 202, and discrimination processing unit 203), and the CPU 208 can perform parallel operations.

(Variation Category)

The information processing apparatus of this embodiment learns pattern identification of a branch structure using face images, which are classified based on three variation categories shown in FIG. 5, as detection target patterns.

A variation category 501 includes in-plane rotation variations. The variation range of detection targets includes up to face images which are respectively rotated through 45° clockwise (+)/counterclockwise from an erected state (a central face image in FIG. 5). In this embodiment, assume that this ±45° range is divided into three ranges: a range from −45° to −15° is labeled by a, that from −15° to +15° is labeled by b, and that from +15° to +45° is labeled by c.

A variation category 502 includes depth rotation variations in the right and left directions. In this embodiment, the variation range of targets includes variations from a frontal face to right- and left-view side faces, and is divided into three ranges. A range from the right-view side face to a face immediately before both the eyes nearly appear (−90° to −30°) is labeled by A, that of faces including the frontal face when both the eyes appear (−30° to +30°) is labeled by B, and that from a face immediately before both the eyes nearly appear to the left-view side face (+30° to +90°) is labeled by C.

A variation category 503 includes size variations. In this embodiment, a face size is specified by the number of pixels of a height difference between both the eyes and mouth in case of 0° in-plane rotation. A minimum face size is 16, and a maximum face size is 22. This range is divided into two ranges, and a range of smaller face sizes is labeled by 1, and that of larger face sizes is labeled by 2. Note that faces falling outside this range are detected by channel processing by enlarging or reducing input images.

This embodiment adopts face images as a mixture of variations based on these three variation categories as detection targets. Depth rotation variations in the up and down directions may be added to these variations, and the number of divisions of each variation category may be further increased to improve the detection precision. However, a description thereof will not be given for the sake of simplicity.

In each variation category, overlap regions with neighboring classifications may be assured, and patterns which belong to the two classifications may exist. For example, for the variation category 501, a range from −45° to −12.5° may be labeled by a, that from −17.5° to +17.5° including an erected image may be labeled by b, and that from +12.5° to +45° may be labeled by c. In this case, for example, +15° rotation data which belongs to one overlap region is classified not only to b but also to c.

In an identification unit (to be described later), one of branch destinations corresponds to any of the above variation categories, and a weak discriminator array of each arm of one branch covers one classification obtained by dividing the variation range of the corresponding variation category as a cover range to be detected. That is, the number of arms of each branch matches the number of divisions of the variation range of the corresponding variation category.

Assuring an overlap region in classifications upon learning is to assure a variation range that can be detected by either of two arms of one branch. In this way, a pattern corresponding to a boundary between neighboring classifications can be surely detected, and an effect of further improving the detection precision can be expected.

(Branch Structure)

A pattern identification unit of this embodiment has a branch structure, and weak discriminator arrays each obtained by cascade-connecting a plurality of weak discriminator nodes are arranged on respective arms of respective branches. The processing of these weak discriminator arrays are executed using the discrimination processing unit 203.

FIG. 3A shows an example of a pattern identification unit having a branch structure. Each of nodes (weak discriminator nodes) indicated by circles 301, 302, and the like includes one weak discriminator. In the identification unit of this embodiment, each node does not adopt a stage configuration having a large number of weak discriminators, but it includes only one weak discriminator, unlike in non-patent reference 1. That is, each individual weak discriminator makes abort determination. However, each node may adopt the stage configuration having a large number of weak discriminators without affecting the gist of the present invention.

FIG. 3A shows an example of a branch type pattern identification unit. A cascade connection of weak discriminators starts from a weak discriminator 301 in the first stage without branching by the predetermined number of stages. The cascade connection branches, at a weak discriminator 302, into two cascade connection sequence starting from weak discriminators 303 and 304. In arms of the branch, weak discriminators continue by the predetermined number of stages, and each branch spreads into three branches at a weak discriminator 305. In each of a total of six arms of the branches, weak discriminators continue by the predetermined number of stages, and then a weak discriminator 306 in the final stage is reached. Each of weak discriminators 301 to 306 performs abort determination, and when processing is aborted at a given weak discriminator, the processes of the subsequent weak discriminators are not executed. Outputs that reach the weak discriminators 306 of the final stage are input to a final determination unit 307 and undergo integration processing. Then, the integrated output undergoes acceptance determination, and if that output is accepted, it is determined that a target object pattern is detected.

Figure 3B:
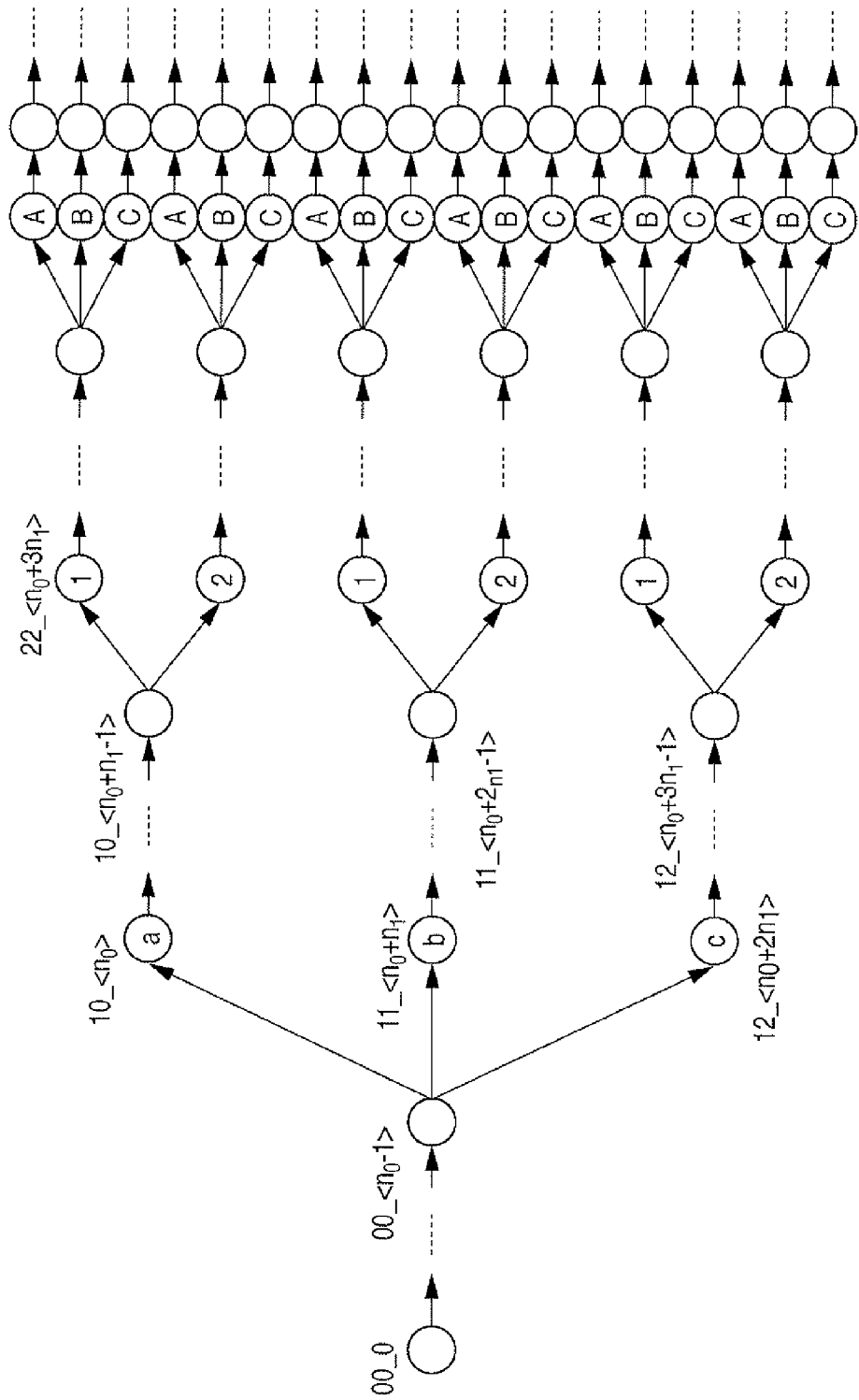

FIG. 3B shows the structure of a branch type pattern identification unit of this embodiment. This embodiment adopts a branch structure based on the three variation categories described with reference to FIG. 5. The branching order is determined in advance by preliminary learning. In case of this embodiment, branching is made in the order of the in-plane rotation variations of the variation category 501, the size variations of the variation category 503, and the depth rotation variations of the variation category 502. That is, in the branch structure shown in FIG. 3B, the first branch includes three branches (a, b, and c), the second branch includes two branches (1 and 2), and the third branch includes three branches (A, B, and C). Details of determination of the length of weak discriminator array between neighboring branches will be described later.

In such tree structure identification unit, some variations of the branch processing execution method are available.

The first method is a full launch method, which executes all the branches. In this case, all outputs of branches which reach the weak discriminators 306 in the final stage without being aborted along the way are input to the final determination unit 307. The final determination unit 307 executes predetermined integration processing according to the output coordinates of respective branches and reliabilities of discrimination, and then executes threshold processing to determine whether or not to accept the integrated output. Merits of this method are that the precision is high, and classifications based on the variation categories can be relatively precisely done simultaneously with detection. As a demerit, a long processing time is required.

The second method is a full search launch method. In this case, for example, the detection processing is executed in turn from an upper branch (the weak discriminator 303 side in case of the weak discriminators 303 and 304 in FIG. 3A) until it is aborted. When the detection processing is aborted, the process returns to an immediately preceding branch (e.g., the weak discriminator 302), and a node (brother node, the weak discriminator 304) immediately under the aborted node is executed. If there is a branch that reaches the final stage, final determination is made. If the output is accepted, the processing is completed. If the output is not accepted, the process returns to an immediately preceding branch to continue the detection processing. Merits of this method are that implementation is easy, and the detection processing can be speeded up to some extent. As a demerit, this method cannot attain precise classifications since it depends on the branch execution order.

The third method is a branch selective launch method. Which of branches is to be launched is selected based on the processing result of a mid node. A merit is high-speed processing, and it is expected to attain higher-speed processing than the second method. Also, relatively precise classifications can be realized although the precision depends on the selection method. A demerit is that slightly complicated processing is required. For example, branch selectable nodes need to be generated like in non-patent reference 3, and another branch selection method needs to be implemented.

This embodiment adopts the third method that can expect the highest processing speed. As the branch selection method, unlike a method of selection before branching in non-patent reference 3, a method of temporarily launching all arms of the branch, and selecting branches to be left based on the processing results of the respective arms (post-branch selection method) is adopted. Details of the branch selection method of this embodiment will be described later.

(Basic Detection Processing)

Figure 4:
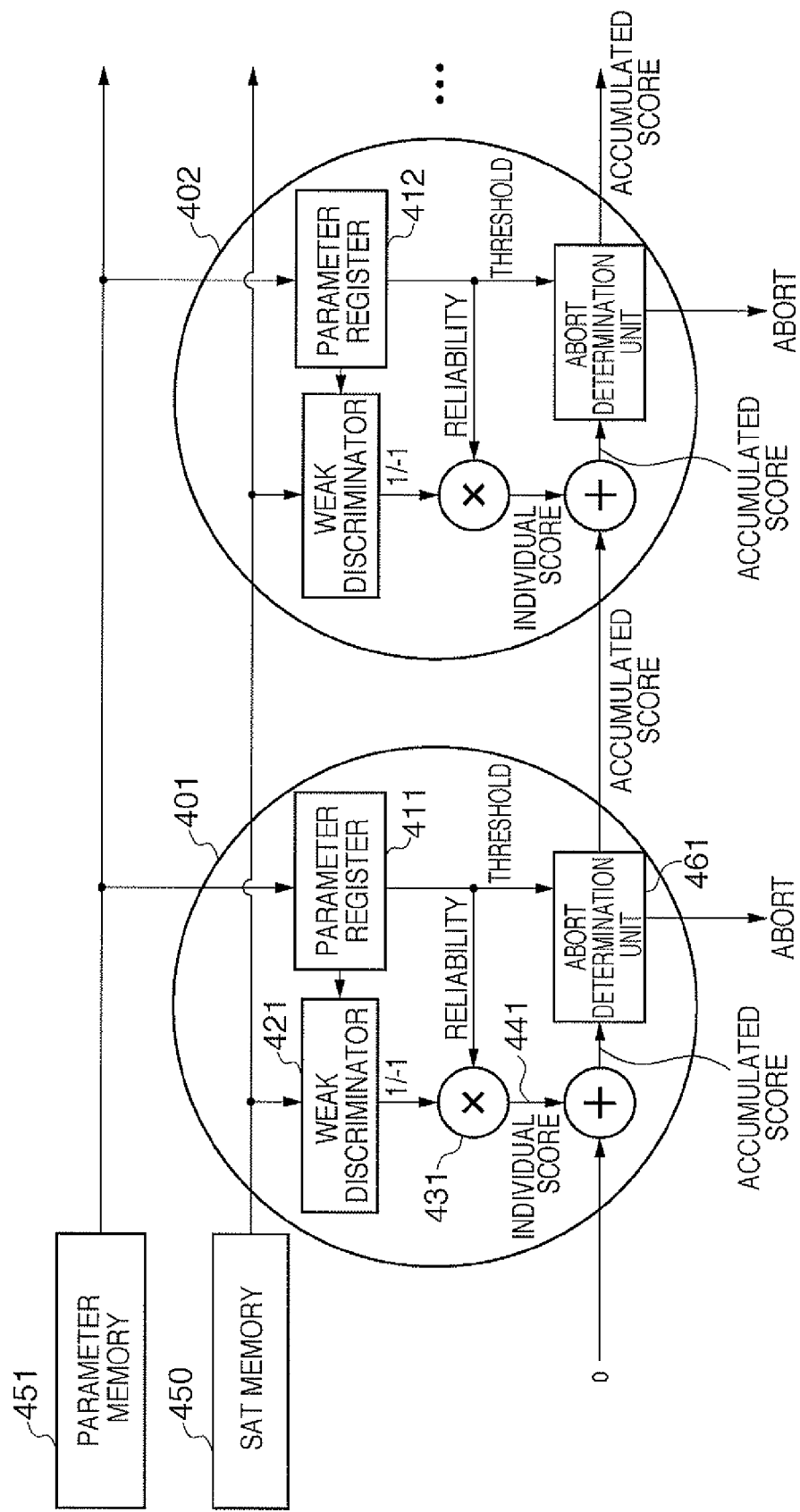
FIG. 4 is a block diagram for explaining the detailed structure of weak discriminator nodes of the pattern identification unit according to the preferred embodiment of the present invention.
Figure 7:
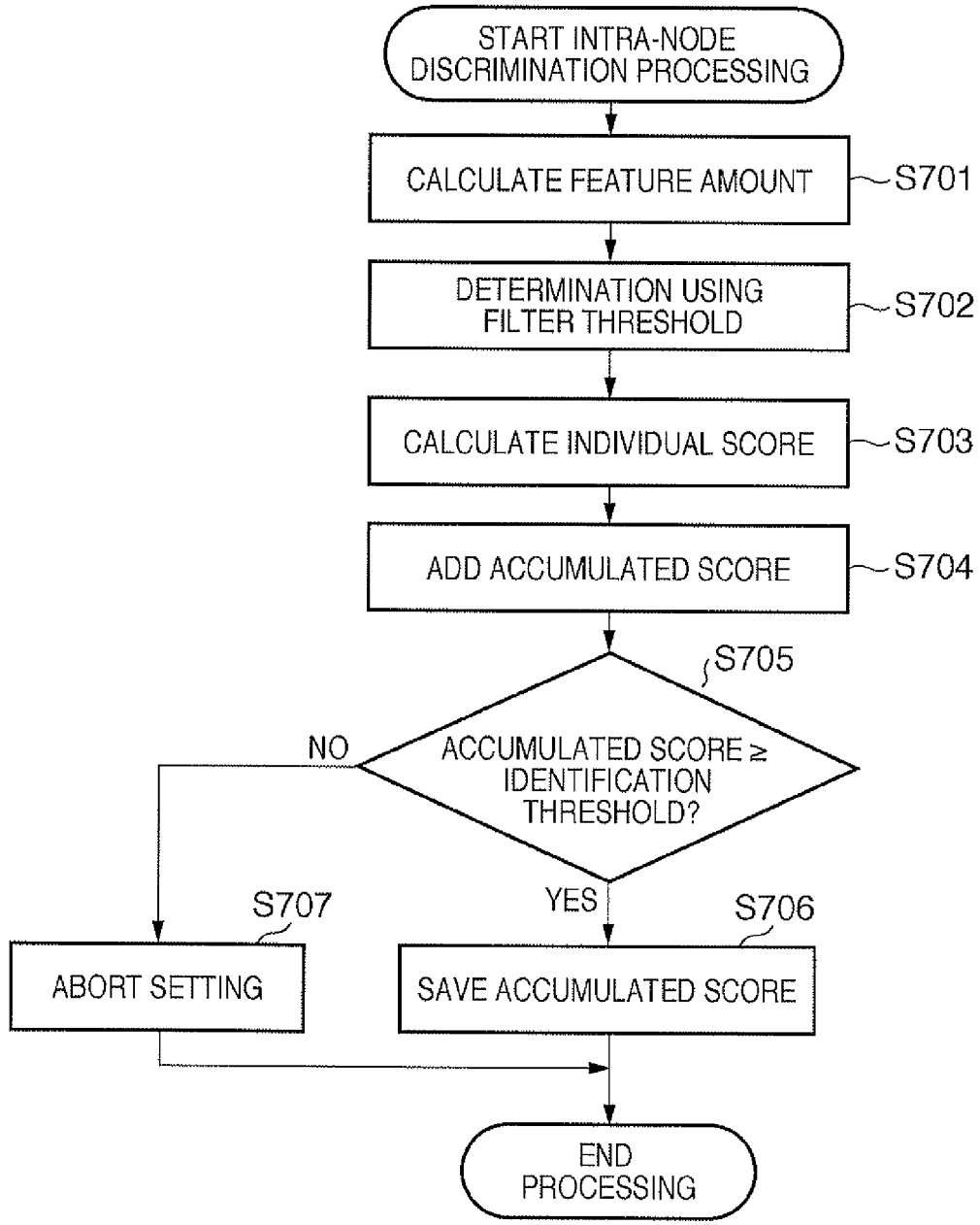
FIG. 7 is a flowchart for explaining an example of processing in an identification unit node according to the preferred embodiment of the present invention.

The basic detection processing in the pattern identification unit of this embodiment will be described below with reference to FIGS. 4 and 7. FIG. 4 is a block diagram showing the internal structure of weak discriminator nodes, and FIG. 7 is a flowchart for explaining the sequence of intra-node discrimination processing executed in each weak discriminator node.

Referring to FIG. 4, each of nodes 401 and 402 indicates one weak discriminator and its peripheral circuit (they are called a node or weak discriminator node together). FIG. 4 shows a logical connection state between the two nodes. As the whole pattern identification unit, more nodes are connected to be cascaded or to be branched halfway, as shown in FIGS. 3A and 3B. These nodes are physically configured by one processing circuit, which is used while time-sharing by switching parameters, thus logically implementing a large number of nodes. For the purpose of high-speed processing, a plurality of nodes may be implemented as physically independent circuits, and processes may be parallelly assigned to these circuits.

Each of parameter registers 411 and 412 stores parameter information required to configure one weak discriminator. A parameter memory 451 in the discrimination processing unit 203 stores the parameter information to be stored in these registers for all the weak discriminator nodes together. The parameter memory 451 is accessible from the CPU 208 and DMAC 204 outside the discrimination processing unit 203, and is set with parameter information prior to execution of the detection processing.

Figure 17B:
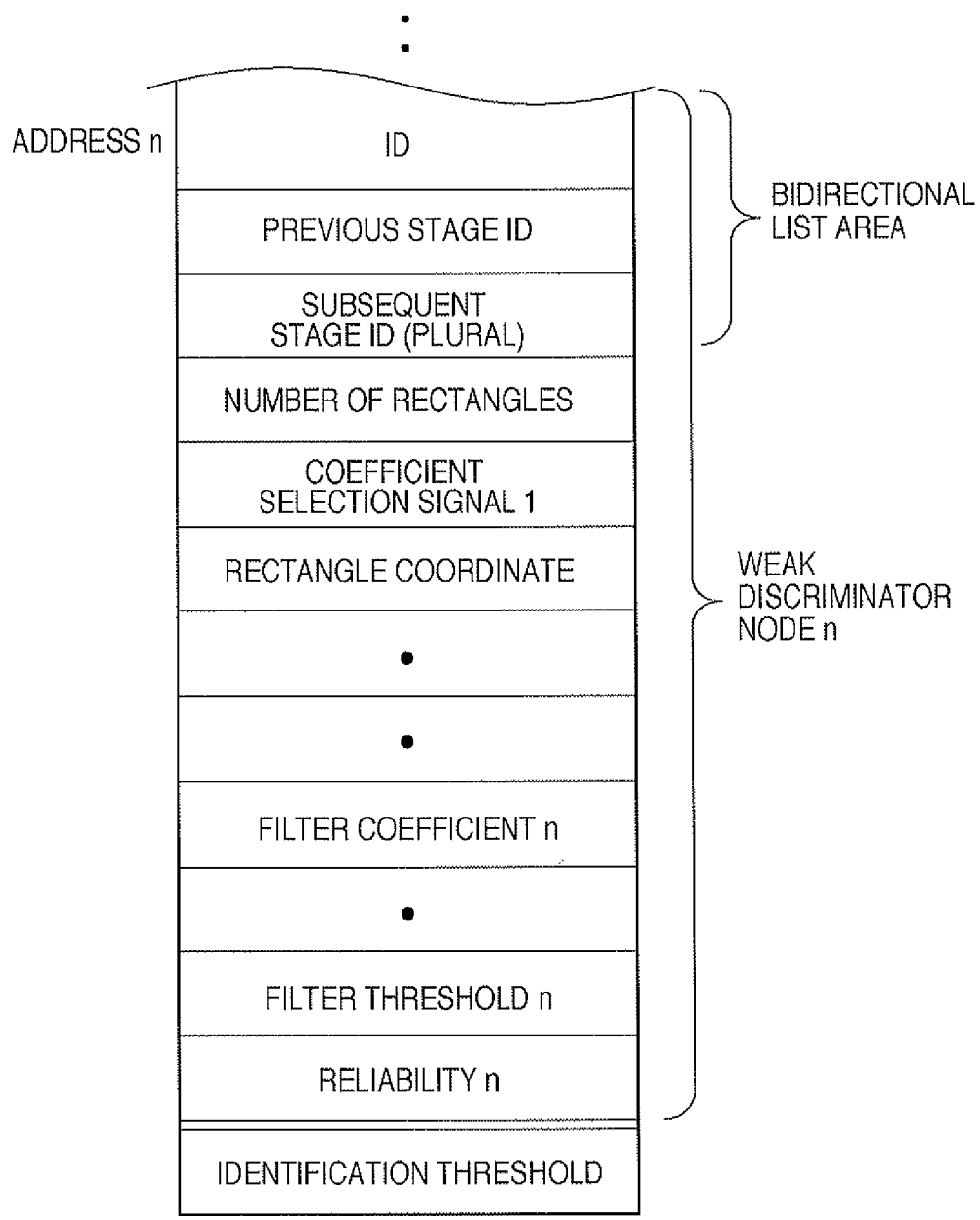

Since the weak discriminator of this embodiment uses rectangular features as in non-patent reference 1, it requires the number of rectangles, rectangle coordinates, filter coefficients, filter threshold, reliability weight (=score), and identification threshold as parameters upon detection. FIGS. 17A and 17B exemplify parameters of respective weak discriminator nodes stored on the parameter memory 451. In addition to these parameters, the parameter memory 451 can hold a self ID, a previous stage ID as an ID of a weak discriminator node of the previous stage, and a plurality of subsequent stage IDs as IDs of a plurality of weak discriminator nodes of the subsequent stages for each weak discriminator node.

Note that the self ID, previous stage ID, and subsequent stage IDs form a kind of bidirectional list, which can express the connection structure (=branch structure) of nodes. Since the first block (weak discriminator node 1) in FIGS. 17A and 17B indicates the first node in the identification unit in FIG. 3B, no previous stage ID is stored, and only one subsequent stage ID is stored. In this embodiment, the subsequent ID field has a fixed size, that is, an upper limit value. That is, the size of the parameter block per node is fixed. In a node immediately before branching, the subsequent stage IDs as many as the number of branches are stored. Upon execution, by tracing this bidirectional list areas, the execution order of the weak discriminators can be specified. The node IDs are assigned according to given roles (to be described later), and the start node has the smallest ID value. Since the parameter memory stores parameters in turn from the parameter blocks in ascending order of ID, the first block always indicates the start node, and processing for reading out parameters corresponding to a desired ID can be easily implemented by an address decoder.

Figure 9:
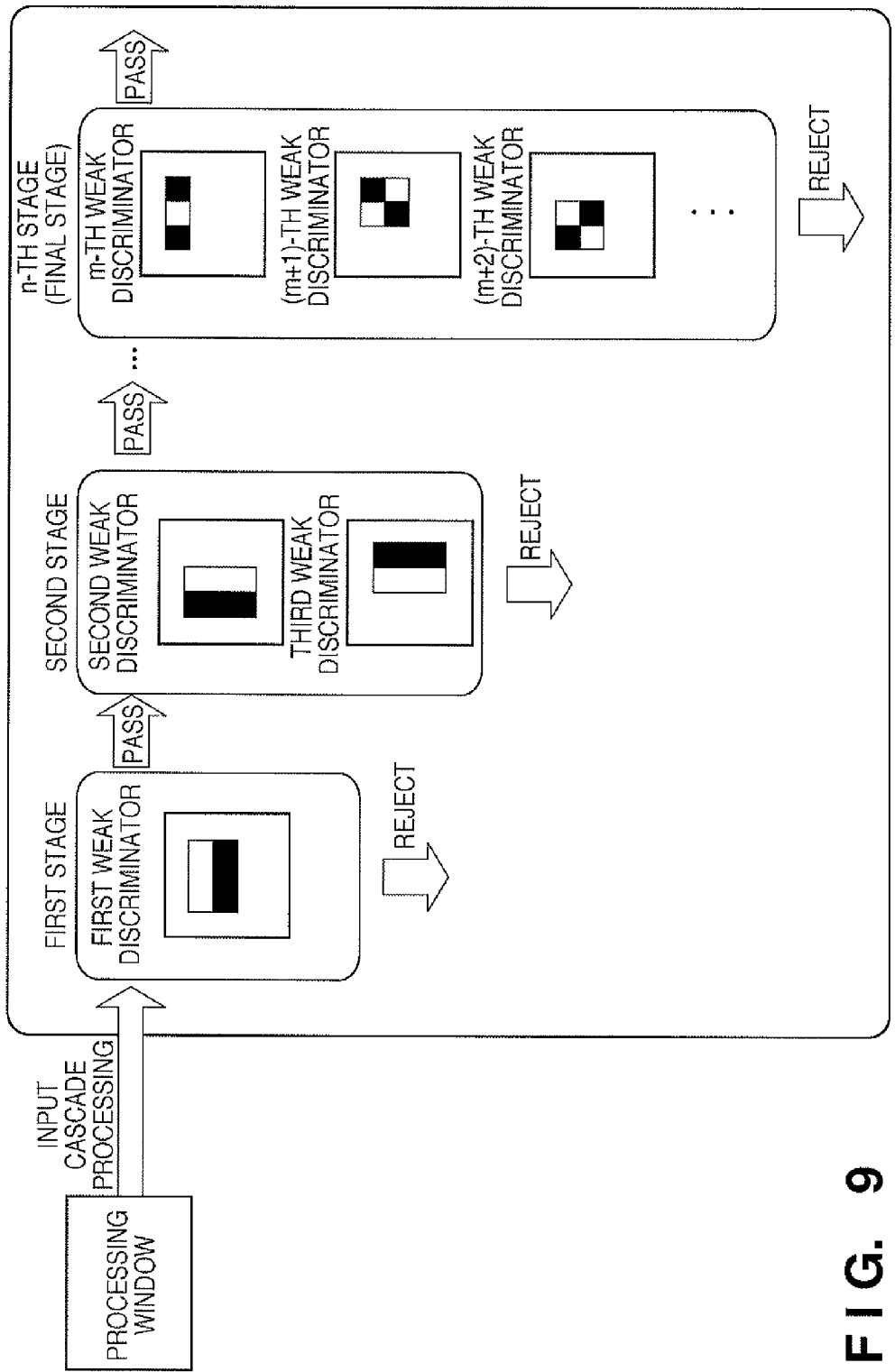
FIG. 9 is a view showing an example of the configuration of a conventional pattern identification unit configured by a plurality of weak discriminators.
Figure 10:
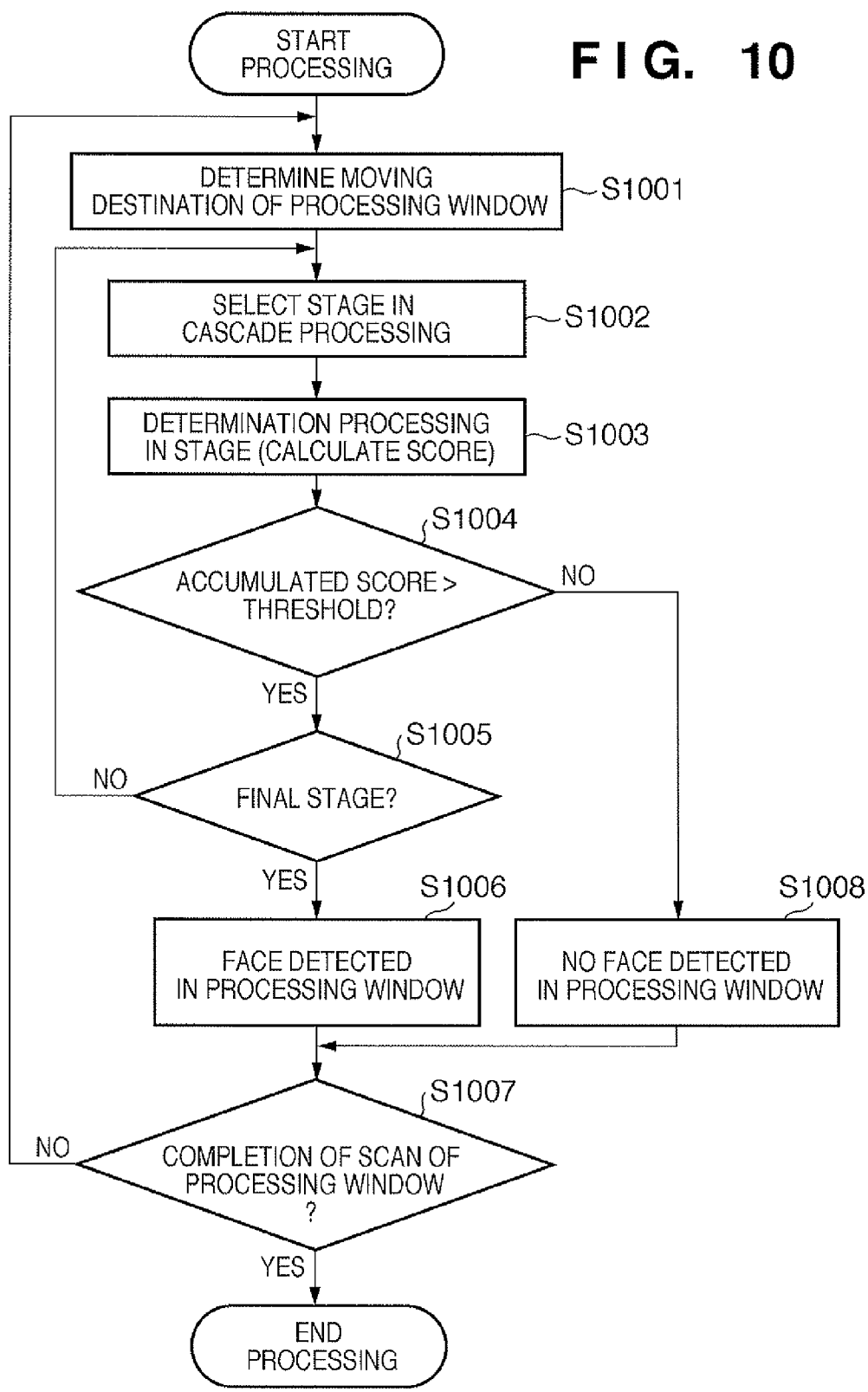
FIG. 10 is a flowchart of detection processing in the conventional pattern identification unit configured by the plurality of weak discriminators.
Figure 11A:
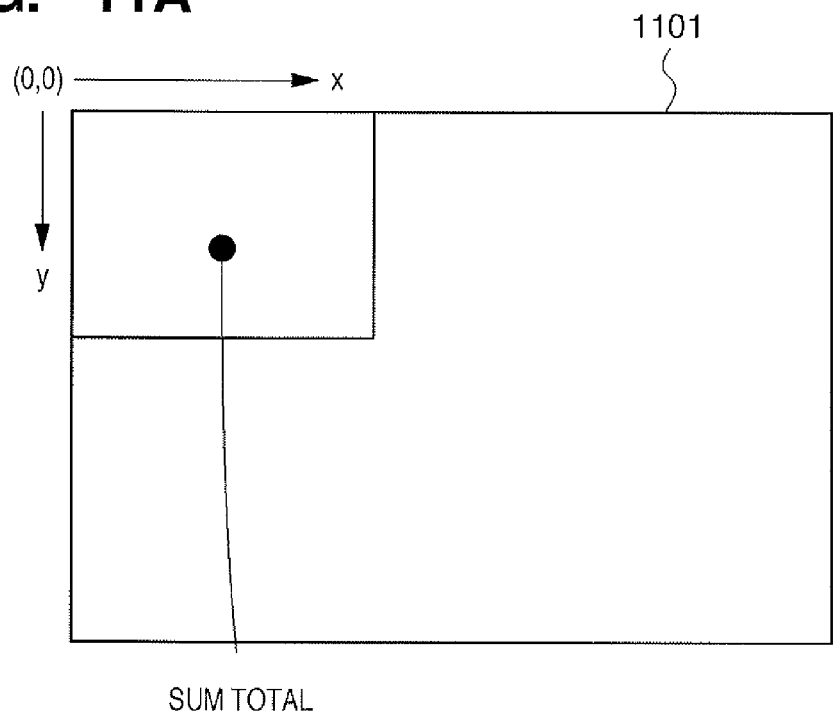
FIGS. 11A and 11B are views for explaining an example of an SAT.
Figure 11B:
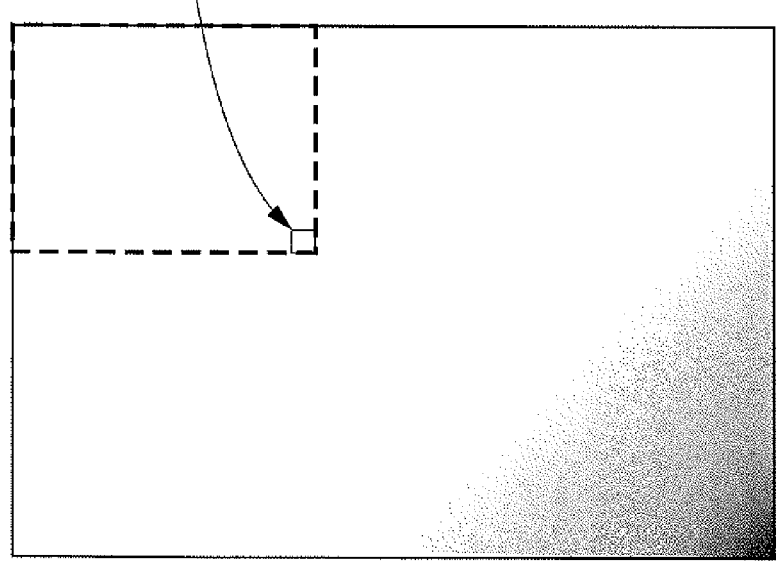
Figure 12:
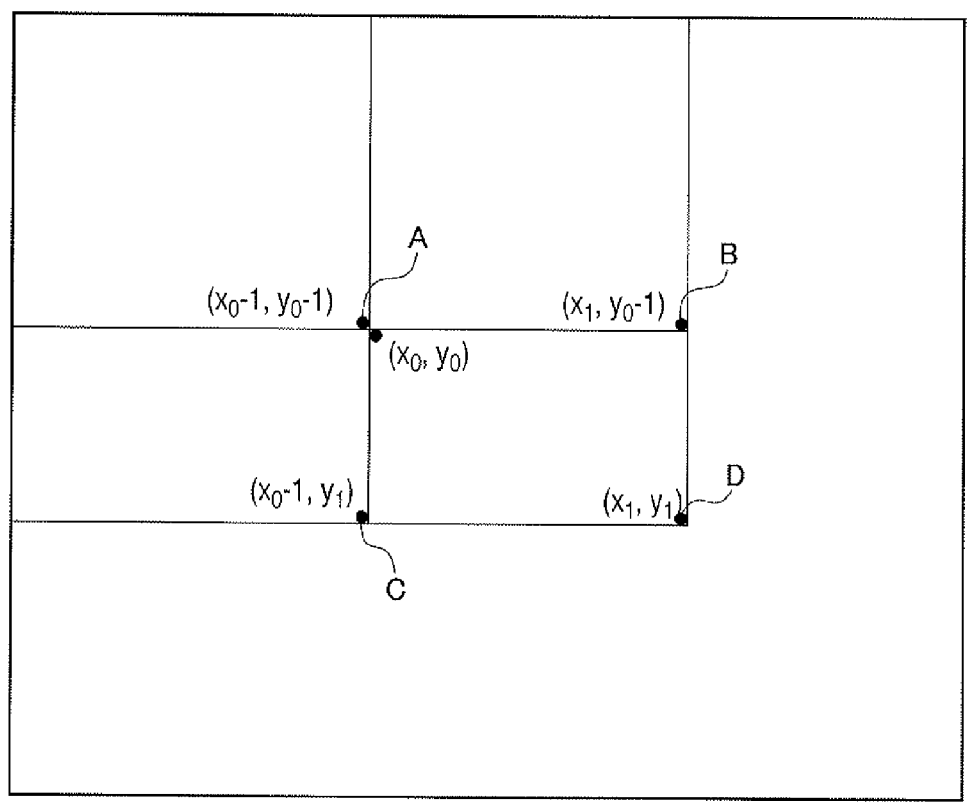
FIG. 12 is a view for explaining a calculation method of a sum total value in a rectangular region based on the SAT.

Of the aforementioned parameters, the "number of rectangles" is information that designates the number of rectangles in a detection window. For example, in case of filters like weak discriminators in the first and second stages shown in FIG. 9, the number of rectangles is 2. In case of the m-th weak discriminator in the n-th stage in FIG. 9, the number of rectangles is 3. In FIG. 9, each of white and black rectangles corresponds to one rectangle. A weak discriminator 421 executes, using the "filter threshold", threshold processing of a total of values obtained by multiplying sum total values (or average values) in rectangles by the "filter coefficients" set for respective rectangles. If a threshold condition (inequality (3)) is satisfied, the weak discriminator 421 outputs "1"; otherwise, it outputs "−1".

$$\sum_{i}^{p} S_i C_i > W_{Th\_t} \quad (3)$$

where p: the number of rectangular regions;
S$_i$: the pixel value sum total in a rectangular region,
C$_i$: the filter coefficient for the rectangular region, and
W$_{Th\_t}$: the filter threshold of the weak discriminator of node t.

The shape, positions, and number of rectangular regions, filter coefficients C$_i$, and filter threshold W$_{Th\_t}$ are parameters determined at the time of learning. In the weak discriminator of this embodiment, C, assumes either of a value "1" or "−1". That is, the left-handed side of inequality (3) corresponds to processing for calculating a difference value of the pixel sum total values S$_i$ in a plurality of rectangular regions. This difference value which is larger than the predetermined filter threshold W$_{Th\_t}$ corresponds to a determination result indicating that input data is an identification target pattern in only the case of this weak discriminator.

The sum total value S$_i$ in a rectangular region can be calculated very quickly with reference to SAT data, as described previously. An SAT memory 450 stores SAT data for input image data for one frame, which is calculated by the preprocessing unit 202 before the beginning of the detection processing. The SAT memory 450 may be assured in the RAM 210, but it is desirably arranged as an internal RAM in the discrimination processing unit 203 to attain high-speed processing. The weak discriminator 421 calculates S$_i$ with reference to the values at the detection window position from the SAT memory 450, and checks if inequality (3) is satisfied.

The "rectangle coordinates" are coordinate information indicating the position of each rectangular region. The "filter coefficients" are positive or negative coefficients. The "reliability weight (score)" is a value indicating the reliability of an individual weak discriminator of a target node. Boosting discrimination is executed using a signed sum total value (to be referred to as an accumulated score hereinafter) of individual scores of respective nodes which have been processed before the t-th node. That is, the accumulated score is a value indicating the probability of discrimination of the whole identification unit by cascade-connecting the first to t-th nodes, that is the reliability of the whole identification unit. The "identification threshold" is a threshold used to perform determination by a boosting discriminator using this accumulated score value.

Let h$_k$(x) (x: input data) be the determination result of a weak discriminator (equivalent to the weak discriminator 421) of the k-th node in the cascade connection, α$_k$ be the reliability, and T$_{gh\_t}$ be the identification threshold of a node of the t-th stage. Then, the abort determination of an abort determination unit (equivalent to an abort determination unit 461) of the t-th stage is described by:

$$\sum_{k=1}^{t} \alpha_k h_k(x) > T_{gh\_t} \quad (4)$$

Note that the value of h$_k$(x) is 1 when each weak discriminator alone determines a detection target object (=when the filter threshold condition of inequality (3) is satisfied), and −1 when it determines a non-detection target object (=when the filter threshold condition is not satisfied).

If inequality (4) is not satisfied, the processing is aborted; otherwise, the processing is continued to output the accumulated score (whole reliability) to the next node. If this discrimination condition is satisfied in the last node, it is determined that a detection target pattern is detected. Note that the reliability α$_t$ and identification threshold T$_{gh\_t}$ are parameters determined upon learning of the node of the t-th stage.

The reliability α$_k$ is read out from the parameter register (equivalent to the parameter register 411 or 412) corresponding to the node, and is multiplied by the output h$_k$(x) of the weak discriminator (equivalent to the weak discriminator 421) by a multiplier (equivalent to a multiplier 431). An adder (equivalent to an adder 441) adds the product to the accumulated score output from the node of the previous stage. The abort determination unit (equivalent to the abort determination unit 461) checks inequality (4) for the accumulated score obtained so far using the identification threshold T$_{gh\_t}$ read out from the parameter register (equivalent to the parameter register 411) corresponding to the weak discriminator.

If the accumulated score is larger than the identification threshold (the right-hand side of inequality (4)), the processing is continued, and the accumulated score is output to the node of the next stage. If the node of interest is a branch node,.and there is a plurality of nodes in the next stage, that node outputs the same accumulated score value to all the nodes (=brother nodes) in the next stage.

FIG. 7 is a flowchart showing the sequence of the processing in each weak discriminator node. Referring to FIG. 7, step S701 is feature amount calculation processing, which calculates the left-hand side of inequality (3). Step S702 is determination processing using the filter threshold, that is, determination processing of inequality (3), which sets the value corresponding to h$_t$(x) in inequality (4) if the node to be processed is that of the t-th stage to be "1" or "−1". This is the output of the weak discriminator 421.

Step S703 is score value calculation processing of each individual weak discriminator node to be processed, which calculates the value corresponding to α$_t$h$_t$(x) in inequality (4). The reliability α$_t$ is the value read out from the parameter register 411 or 412, as described above.

In step S704, an accumulated sum value (accumulated score value) is calculated by adding the score value to the output value from the previous stage. In the calculation of the accumulated score value, the left-hand side of inequality (4) is calculated. The accumulated score value until the previous stage is held in an internal memory in association with the ID of the node of the previous stage upon completion of execution of the processing of the node of the previous stage.

Since the previous stage ID is stored in the parameter register of the node in execution, the accumulated score value until the previous stage can be read out from the memory using the previous stage ID. Therefore, the processing in this step need only add the value calculated in step S703 to the value read out from the memory.

In step S705, discrimination processing corresponding to inequality (4) is executed. This processing is executed by the abort determination unit 461. If it is determined in step S705 that the processing is to be aborted, an abort setting (to set a flag or the like) is made in step S707 to abort the processes of the subsequent stages. If it is determined that the processing is not to be aborted, the accumulated score value is stored in an internal memory (not shown) in association with the node ID in step S706, so that it is usable in the node processes of the subsequent stages. In step S706, the processing result values other than the accumulated score, for example, the individual score value and the like may be held. The processing of the weak discriminator node executed by the discrimination processing unit 203 has been described.

Upon completion of all the weak discriminator nodes which are not aborted, these accumulated score values are input to the final determination unit 307 in FIG. 3A. Integration processing is applied to the accumulated score values which remain without being aborted, and threshold processing is executed using the final identification threshold. If simultaneous selection of a plurality of arms is permitted in branch selection (to be described later), the outputs of a plurality of accumulated score values may reach the final determination unit 307 at the same time. In this case, the integration processing may, for example, add all the reached accumulated score values or may use their maximum value or average value. If selection of only one arm is permitted, since the final determination unit executes the same simple threshold processing as that executed by the abort determination unit 461, the abort determination unit of the weak discriminator 306 of the final stage may execute that processing instead.

(Node ID)

Each weak discriminator node is assigned a node ID, as shown in FIG. 3B. This node ID is separated into a branch-arm ID part and unique ID part. The unique ID part includes a number uniquely assigned to each node. No. 0 is assigned to the unique ID part of the start node, and that number is incremented one by one as the number of processing stages increases. After branching, serial numbers are assigned to nodes per arm until the next branch is reached. After the next branch is reached, the next number is assigned to the first node of the next arm. That is, there are no nodes with the same unique ID, and by multiplying the unique ID number by the block size, the address of a parameter block corresponding to the node on the parameter memory can be easily calculated.

The branch-arm ID part includes two numbers, that is, a branch number and arm number. The branch number is zero in an initial non-branching state, and is incremented by one every time the process branches. The arm number starts from 0 every time the process branches, and numbers in 1-increments are assigned to respective arms.

According to the aforementioned rules, for example, letting no be the number of processing stages before branching, the ID of the start node is 00_0, and that of a node immediately before the first branch is 00_<$n_0-1$>. Furthermore, letting $n_1$ be the number of processing stages after the first branch and immediately before the second branch, the ID of the first node of the first arm of the first branch is 10_<$n_0$>. The ID of a node immediately before the second branch of the weak discriminator array of that arm is 10_<$n_0+n_1-1$>, and that of the first node of the second arm is 10_<$n_0+n_1$>.

(Detection Processing With Branch Selection)

Figure 8:
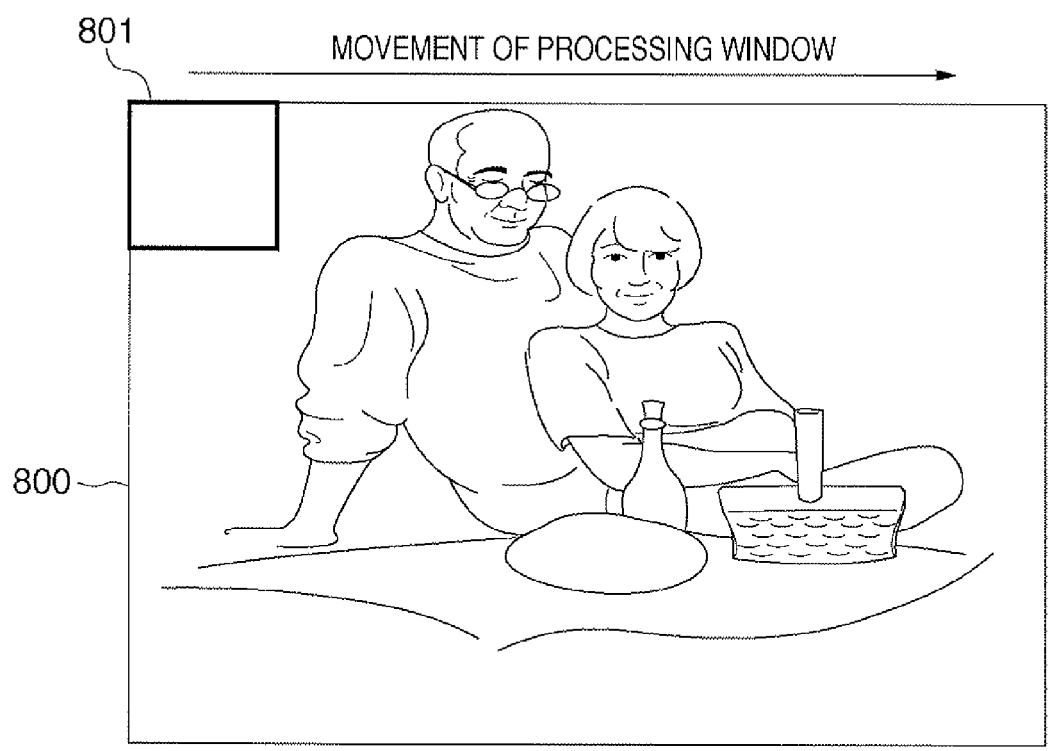
FIG. 8 is a view for explaining face detection processing as an example of pattern recognition processing according to the preferred embodiment of the present invention.

The sequence of the detection processing to be executed while executing branch selection upon inputting an image for each sub-window (equivalent to the image 801 in FIG. 8) will be described below with reference to FIGS. 15A and 15B. This processing is executed using the respective units including the discrimination processing unit 203 in response to instructions from the CPU 208 in FIG. 2.

In step S1501, initial setting processing of an execution schedule queue is executed. This processing inserts the IDs of nodes scheduled to be executed in a queue in the execution order. As the IDs described above, since the ID of the first node is determined to be 00_0, it is inserted first. Then, the IDs are inserted in the order of processing according to the connection structure of nodes by tracing the IDs of bidirectional list areas of the parameter memory. In this case, the IDs are set under the assumption that nodes until the predetermined number of stages ($m_1$) after the first branch are to be executed. That is, after the ID: 00_0 to the ID: 00_<$n_0-1$> before branching are inserted, the IDs of the first arm of the first branch from the ID: 10_<$n_0$> to the ID: 10_<$n_0+m_1-1$> are inserted. Then, after the IDs of the second arm from the ID: 11_<$n_0+n_1$> to the ID: 11_<$n_0+n_1+m_1-1$> and those of the third arm from the ID: 12_<$n_0+2n_1$> to the ID: 12_<$n_0+2n_1+m_1-1$> are inserted, the processing is aborted.

The predetermined number $m_1$ of stages is the minimum required number of non-branching continuous stages to be continued, which is determined at the time of learning (to be described later), and may match the number $n_1$ of continuous stages from the first branch to the second branch ($m_1 \leq n_1$). As will be described later, this identification unit determines an arm which continues processing based on the processing results until the $m_1$ stages of the weak discriminator arrays of all the arms of the first branch. Therefore, the processes by the nodes until the ID: 12_<$n_0+2n_1+m_1-1$> inserted in the execution schedule queue are inevitably executed unless they are aborted in the middle of the arms. That is, nodes of the ($m_1$)-th stage of the first branch are branch selection nodes for the first branch. Also, assume that nodes of the ($m_2$)-th and ($m_3$)-th stages are branch selection nodes for the second and third branches, respectively.

In step S1502, one first ID stored in the execution schedule queue is extracted. The intra-node determination processing in step S1503 is executed for a node with the extracted ID. Details of the intra-node determination processing are as have been described above using FIG. 7.

It is checked in step S1504 if the intra-node discrimination processing result indicates abort determination. If the result indicates abort determination, and if the node in execution is one node in the weak discriminator array before the first branch, the subsequent processes need not be executed. If the node in execution is one node in weak discriminator array of one arm of the branch, discriminators of the subsequent stages of that arm, and those of all arms spread from that arm need not be executed.

Processing for removing the IDs of all nodes which need not be executed from the execution schedule queue is step S1505. In this processing, the branch-arm ID part of the abort-determined node is checked first. Then, the execution schedule queue is scanned from the beginning, and all IDs whose branch-arm ID part match that ID part are removed. The ID which is removed last is held, and when all IDs with the same branch-arm ID are removed, its subsequent stage IDs are checked from the parameter memory using the last ID. Then, the execution schedule queue is scanned again to remove all IDs whose branch-arm ID parts match that ID parts of the checked subsequent stage IDs. By repeating this processing, the IDs of all the nodes after the abort-determined node can be removed from the execution schedule queue.

It is checked in step S1506 if other node IDs still remain in the execution schedule queue. If a node before the first branch is aborted, no ID remains in the queue at that time. If a node of any of arms after the first branch is aborted, IDs of other arms are likely to remain. If it is determined that other node IDs still remain, the process returns to step S1502 to extract the IDs one by one again, thus executing the discrimination processing.

If no ID remains in the execution schedule queue, the process advances to step S1507 to check if another continuing arm other than the aborted arm remains. This checking process is attained by seeing if a continuing ID (to be described later) is held. If the continuing arm remains, the process advances to step S1511 (to be described later). If no continuing arm remains, all the arms are aborted, and it is determined that the sub-window of interest does not include any face, thus ending the processing.

If it is determined in step S1504 that the result does not indicate abort determination, the process advances to step S1508 to check if the executed node is a terminal end node stored in the queue. If the execution schedule queue is scanned, and no IDs of the subsequent node of the same arm are stored in the queue, it is determined that the executed node is the terminal end node in the queue. In step S1509, the currently executed node ID is held in a predetermined area of a memory as a continuing ID. If the executed node is not a terminal end node, the process in step S1509 is skipped.

It is checked in step S1510 if other IDs still remain in the execution schedule queue. If other IDs still remain, the process returns to step S1502 to repeat the processes, so as to execute nodes of these IDs as in step S1506.

If all the IDs are extracted from the execution schedule queue, the process advances to step S1511 to check the presence/absence of non-execution nodes. As a result of the previous processing, since the continuing node ID is held in the predetermined area of the memory in step S1509, the bidirectional list area of the parameter memory 451 is accessed using this ID to check if the subsequent stage IDs are set. If it is determined that the subsequent stage IDs are set, the presence of non-execution nodes is determined.

If the presence of non-execution nodes is determined, the process advances to step S1512 to execute branch selection processing. The branch selection processing of this embodiment uses the processing results of weak discriminators at a predetermined stage position of all the arms of the branch to be processed. Therefore, prior to step S1512, the processes of weak discriminators of the predetermined number of stages or more in all the arms have to be completed. In the above description, the IDs to be stored in the execution schedule queue are those up to the predetermined number of stages. However, the number of IDs is not particularly limited as long as it is equal to or larger than the predetermined number of stages.

Figure 16:
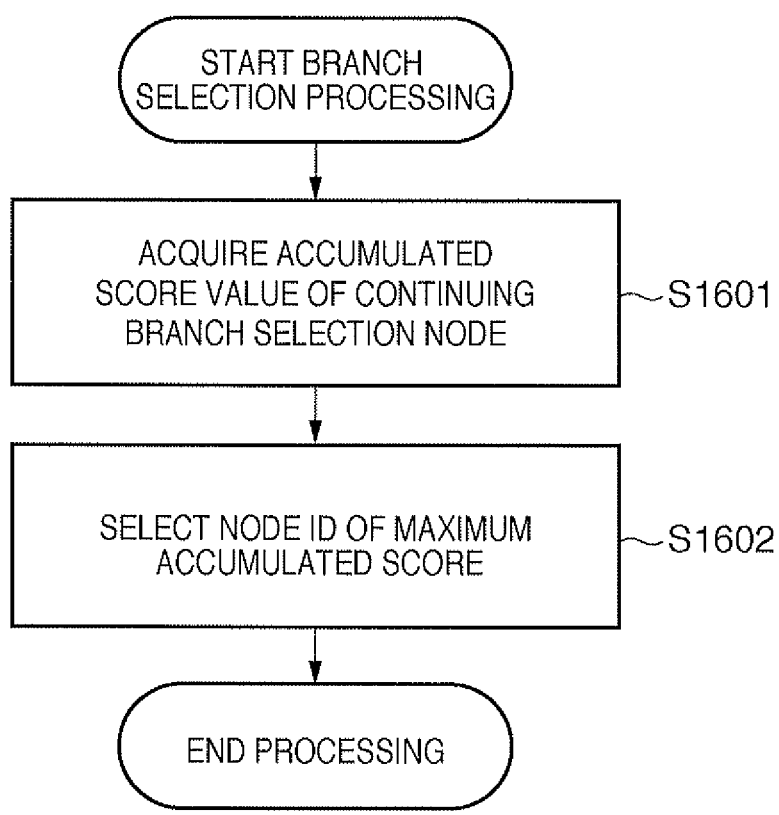
FIG. 16 is a flowchart for explaining details of branch selection processing according to the first embodiment.

The branch selection processing of this embodiment is very simple, as shown in the flowchart of FIG. 16. In step S1601, the accumulated score values of the continuing branch selection nodes are acquired. As described above, since the continuing ID is held, and the previous ID indicates a terminal end node stored in the execution schedule queue, that ID indicates a node whose processing is not aborted in the branch selection stage ($m_1$-, $m_2$-, or $m_3$-th stage) Since the accumulated score value is held in association with the ID, as described in step S706 in FIG. 7, it can be acquired using the continuing ID.

In step S1602, the ID of a node having a maximum accumulated score value is selected as an ID to be continued. That is, the branch-arm ID part of the selected ID indicates an arm of the selected branch. Note that a new threshold may be used, and not only an ID with a maximum accumulated score value but also a plurality of IDs within a range of the threshold may be left. As a result, although the number of arms of the branch to be processed increases, the precision can be improved in a tradeoff with the processing speed.

Referring back to FIG. 15B, the execution schedule queue is re-set in step S1513. This processing refers to the bidirectional list area of the parameter memory 451 using the continuing node ID of the remaining branch as a result of the branch selection processing in step S1512. Then, all the remaining nodes of the branch arm to which the continuing node belongs, and branch selection nodes up to the predetermined number of stages of respective arms of the next branch are stored in the execution schedule queue. As described previously, the predetermined number of stages is up to the $m_2$-th stage in the second branch and $m_3$-th stage in the third branch, and it is determined at the time of learning (to be described later). When there is no subsequent branch, the IDs of all nodes that follow the continuing node ID in the bidirectional list until the terminal end are stored in the execution schedule queue.

In step S1514, the held continuing ID is cleared, and the process returns to step S1502 to repeat the processes for respective nodes.

If it is determined in step S1511 that there is no non-execution node, integration processing in step S1515 is executed. This integration processing integrates the output values of the IDs left as the continuing nodes, and calculates an average value, total value, or maximum value as a reliability score value used to determine a final face probability. Furthermore, a face variation may also be estimated based on the reached branch arms.

In step S1516, the calculated reliability score value undergoes final threshold processing to discriminate if a face is detected. This step corresponds to the processing of the final determination unit 307 in FIG. 3A.

(Basic Learning Processing)

Figure 6:
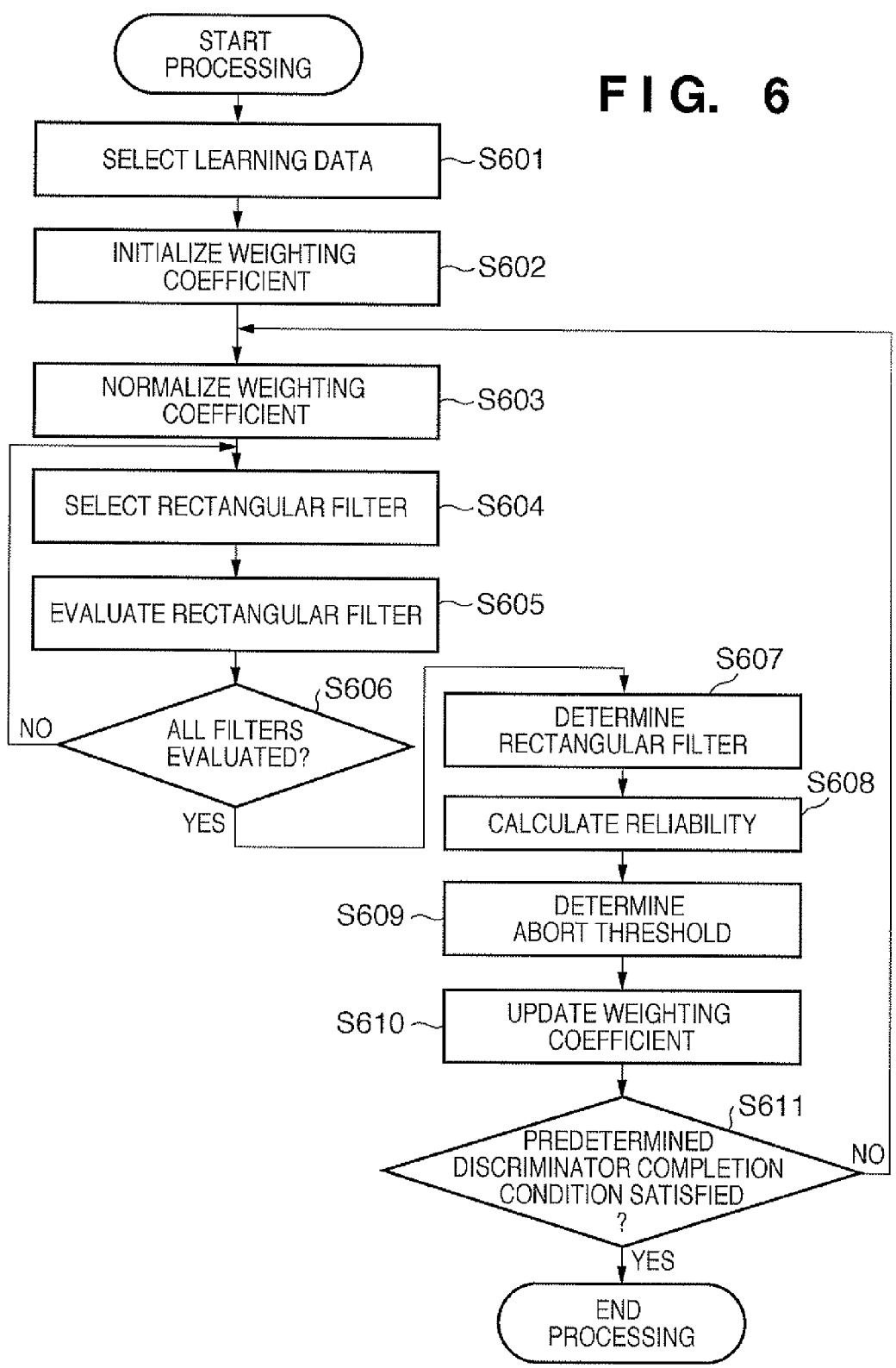
FIG. 6 is a flowchart for explaining details of the basic learning processing according to the preferred embodiment of the present invention.

A basic method of generating a boosting type pattern identification unit according to this embodiment by machine learning processing will be described below with reference to FIG. 6. FIG. 6 is a flowchart of machine learning processing for generating a pattern identification unit configured by only a non-branching weak discriminator array in line. Upon learning respective weak discriminator arrays corresponding to respective arms of a branch, basically the same algorithm is used. Note that face data of learning data sets used for respective arms correspond to classifications of variation ranges to be covered by the respective arms.

The machine learning processing to be described below is implemented when the CPU 208 in FIG. 2 executes a learning processing program.

Prior to the learning processing to be described below, data groups required for learning are classified according to variation categories and are stored in the large-capacity storage unit 211. These data groups are face or non-face patterns extracted into data 801 of the processing window size described above using FIG. 8. Alternatively, data may be extracted every time processing is executed. Then, a large number of detection target data having variations classified by the variation ranges of a variation category corresponding to a weak discriminator array to be learned, and a large number of non-detection target data such as backgrounds and the like can be used. For example, upon learning of a weak discriminator array in an arm after the third branch, which covers a variation range of label aB1 described in FIG. 5, all or some of face image data which are classified to the same label aB1 and are held in the large-capacity storage unit 211 are used. For a non-branching arm, data including variations of all categories are used. Upon learning of arms of the first branch, data including all variations for the variation categories 502 and 503 are used. Upon learning of arms of the second branch, data including all variations for the variation category 503 are used.

A weak discriminator is learned according to an ensemble learning algorithm called AdaBoost. The basic learning algorithm is the same as the method described in non-patent reference 1.

In step S601, data to be used in the current learning are selected from learning data held in the large-capacity storage unit 211. In this case, face data as detection target patterns and non-face data as non-detection target patterns are extracted, so that the numbers of extracted data satisfy a predetermined ratio.

Since a preliminary identification unit or a branch of a main identification unit includes classifications as a combination of variation categories to be covered, face data that belong to these classifications are selected as detection target patterns. As non-detection target patterns, non-face data are used. Furthermore, as non-detection target patterns, face patterns classified in a combination of variation categories which are not to be covered may be added upon learning. As a result, it is expected for the preliminary identification unit or branch to execute detection processing with higher selectivity.

In step S602, weighting coefficients for the extracted learning data set are initialized. If the total number of learning data is m, all weighting coefficients $w_{t,j}$ (t: a node number, j: a learning data number) are initialized by:

$$w_{1,i} = \frac{1}{m}, i = 1, \ldots, m \quad (5)$$

That is, at the time of learning of the first node, common weights are given to all the learning data. In step S603, processing for normalizing the weighting coefficients according to:

$$w_{t,i} \leftarrow \frac{w_{t,i}}{\sum_{j=1}^{m} w_{t,j}} \quad (6)$$

is executed.

When this step S603 is executed for the first time, the weighting coefficients $w_{1,j}$ assume values set in step S602 (equation (5)), and already satisfy formula (6). Therefore, this step S603 is processing for normalizing the sum total of the weighting coefficients $w_{t,j}$ to 1 when the weighting coefficients $w_{t,j}$ are changed at the time of learning of the second node and subsequent nodes.

In steps S603 to S610, one weak discriminator is learned.

In step S604, one rectangular filter is selected from a rectangular filter group. The rectangular filter group includes a plurality of rectangular filter candidates having modifications according to sizes and positions in a detection window with respect to a basic rectangular filter having a predetermined shape. For example, in case of difference filters of upper and lower neighboring rectangular regions exemplified in the first weak discriminator in FIG. 9, a plurality of modifications are available in accordance with the sizes and aspect ratios of each rectangular region and the positions in the detection window. As the rectangular filter group, all combinations are prepared with reference to some predetermined basic rectangular filters as well as their modifications. Serial numbers are assigned to the prepared rectangular filters as filter numbers. This step executes processing for selecting these prepared rectangular filter candidates one by one in turn.

Then, using the rectangular filter candidate selected in step S605, the discrimination performance of this rectangular filter for all the learning data is evaluated. Initially, output values of this rectangular filter are calculated for all the learning data, and a threshold used to separate detection and non-detection targets is determined. At this time, the filter output value calculations are processed by hardware using the discrimination processing unit 203. The threshold is determined using histograms of the rectangular filter output values.

Figure 13:
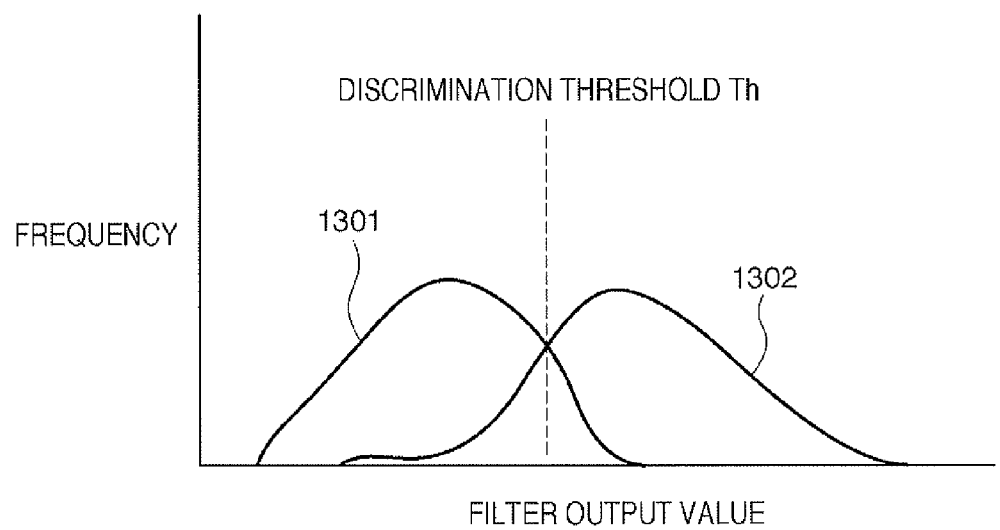
FIG. 13 is a view for explaining a determination method of a filter threshold.

FIG. 13 shows a histogram 1302 of detection target data and a histogram 1301 of non-detection target data with respect to all the learning data. The abscissa plots the filter output value (rectangular difference value), and the ordinate plots the number of learning data used to yield that value. A threshold $F_{Th\_t,j}$ (that minimizes an error ratio, t: a node number in learning, j: a filter candidate number) which best separates detection and non-detection targets is determined using these histograms. Furthermore, in step S605, detection error ratios for all the learning data are calculated using the determined threshold $F_{Th\_t,j}$. Weighted error ratios for all the learning data are given by:

$$E_{t,j} = \Sigma_i w_{t,i} |h_{t,j}(x_i) - y_i| \quad (7)$$

where t: a node number in learning,
j: a filter candidate number, and
i: a learning data number.

Note that $h_{t,j}(x_i)$ is the determination output of a learning data number i by a rectangular filter candidate j: "1" is output when it is determined that input target data $x_i$ is a detection target using the threshold $F_{Th\_t,j}$; or "0" is output when it is determined that the input target data $x_i$ does not include any detection target. $y_i$ is a correct answer label (teaching label), which is assigned "1" or "0" depending on whether or not input learning data i is a detection target. By the repetitive processing in step S606, the aforementioned processes (steps S604 and S605) are executed for all the rectangular filter candidates, thus calculating weighted error ratios $E_{t,j}$.

Upon completion of the calculations of all the weighted error ratios $E_{t,j}$ (step S606), a rectangular filter candidate j with the smallest weighted error ratio $E_{t,j}$ (i.e., a rectangular filter with the highest discrimination performance) is searched, and is selected as a weak discriminator (step S607). Let $E_t$ be a weighted error ratio at that time. Also, the threshold $F_{Th\_t,j}$ used in this filter is determined as a filter threshold $W_{Th\_t}$.

Then, a reliability $\alpha_t$ for the weak discriminator is calculated (step S608) by:

$$\alpha_t = \log\left(\frac{1 - E_t}{E_t}\right) \quad (8)$$

The calculated reliability $\alpha_t$, filter threshold $W_{Th\_t}$, and the shape, positions, the number of rectangles, and filter coefficients of the rectangular regions of the rectangular filter are recorded as parameters of node t in learning in the RAM 210.

Figure 14:
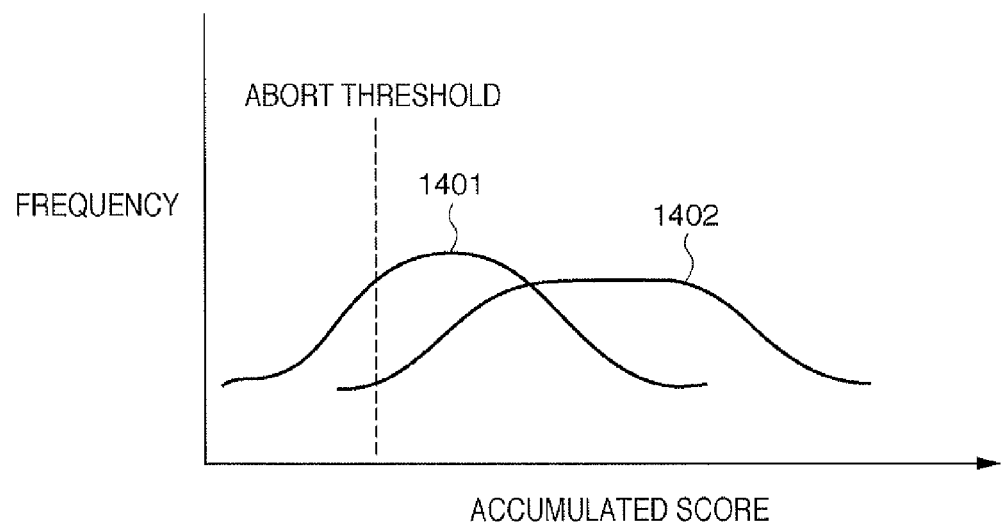
FIG. 14 is a view for explaining a determination method of an abort threshold.

In step S609, an abort threshold is determined. In this case as well, a threshold can be determined based on a histogram of accumulated scores for detection target data and that of accumulated scores for non-detection target data in the same manner as the method of determining the determination threshold of the rectangular filter. FIG. 14 is a view for explaining an example of accumulated histograms to explain a method of determining an abort threshold. Reference numeral 1401 denotes a histogram of accumulated scores for non-detection target data; and 1402, a histogram of accumulated scores for detection target data. The abort threshold is determined to fall within an allowable range in which an abort ratio (the number of aborted detection target data/the number of detection target data) with respect to detection target data is equal to or smaller than a predetermined value. The number of aborted detection target data is the total number of data whose accumulated scores of the histogram 1402 become equal to or smaller than the threshold determined in this step. Non-detection target data need not be considered in this step since they are aborted as early as possible. The threshold determined in this step is an abort threshold parameter $T_{gh\_t}$ used in the abort determination unit 461 in FIG. 4.

Furthermore, in step S610 the weighting coefficients for respective learning data are updated by:

$$w_{t+1,i} = w_{t,i} \times \left( \frac{E_t}{1 - E_t} \right) \quad (9)$$

Note that the weighting coefficients $w_{t,j}$ to be updated by equation (9) are only those of correctly detected learning data i. That is, the weights for correctly detected learning data (both detection target data and non-detection target data) are updated to be reduced. Therefore, in step S610 the weights for erroneously detected learning data are relatively increased.

After one weak discriminator is generated by the processes (steps S603 to S610) executed so far, it is determined in step S611 if a boosting identification unit which satisfies a predetermined completion condition is generated. Note that the predetermined condition is satisfied first when the number of weak discriminators reaches an upper limit value which is set in advance. Alternatively, the predetermined condition is satisfied when the weighted error ratios $E_{t,j}$ calculated using equation (7) are smaller than a predetermined value or when a performance measurement unit arranged separately determines that the identification performance of the whole identification unit can achieve desired performance at the time of start of learning. If the condition is not satisfied, the process returns to step S603 to continue the generation processing of subsequent weak discriminators.

(Learning and Evaluation Data Sets)

In this embodiment, prior to learning, input and classification processes of sample data are executed. This is the processing for inputting object image data as detection targets (face image data in this embodiment) used in learning processing and evaluation processing in the learning processing, and data in sufficiently large quantities, which include all variations of target categories, are required. Learning data and evaluation data may be separately input, or face image data groups in large quantities may be input, and may be used by sampling at the time of the learning processing and evaluation processing.

A set of non-detection target patterns such as objects which are not detection target objects, backgrounds, and the like, that is, a set of non-face data in this embodiment, are also input to the apparatus, and can be used in the learning and evaluation processes.

These data are input by the image input unit 201 in FIG. 2. When the image input unit 201 comprises an image sensing device, data are accumulated when the user inputs required additional information (position coordinates of the eyes and mouth, and the like) to face images acquired by image sensing via the user I/F 207. Alternatively, face images acquired in advance can be input together with additional information from an external apparatus via the communication I/F 206 shared by the image input unit 201. The input learning data and evaluation data are held in the large-capacity storage unit 211.

The input and held face image data are classified (labeled) in all the variation categories to be supported by the identification unit using the additional information. For example, a "face which is rotated counterclockwise through 30° in an in-plane rotation direction, is rotated through 10° to the left in a depth rotation direction, and has a size 18" is classified as "aB1" using a label shown in FIG. 5.

In this embodiment, face data is appended with three pieces of information, for example, two-eye coordinates, mouth coordinates, and a depth rotation angle. When the user inputs these pieces of information using the user I/F 207, he or she inputs the coordinates of the eyes and mouth on a face image displayed on the display using a pointing device such as a mouse or the like. Also, the user inputs a (subjective) depth rotation angle using a keyboard. When learning data and evaluation data are sent from an external apparatus, these pieces of additional information which have already been input are sent together.

In this embodiment, the in-plane rotation angle of the variation category 501 is calculated based on an angle of a line segment which couples the two eyes. When this line segment is horizontal in an image, an in-plane rotation angle is 0°, and a clockwise rotation angle assumes a positive value with reference to this angle. A size variation of the variation category 503 is calculated based on the number of pixels of a difference of a height from the line segment that couples the two eyes to the mouth position. When only one eye appears in a side face, a top-of-head direction indicating a position immediately above the head is separately input as additional information, thus allowing calculations of the in-plane rotation and size. The number of pieces of additional information indicating feature point positions such as an inner canthus and outer canthus of one eye, ear position, nasal aperture position, and the like may be increased, and the top-of-head direction may be estimated and calculated based on these pieces of information.

The input and classification processes of learning and evaluation data may be executed at any timing prior to the beginning of learning. When data used in learning and evaluation to be described below are different, the input and classification processes of these data need only be complete before the beginning of each of these processes, and be held in the large-capacity storage unit 211.

Alternatively, during the learning processing, classified data stored in an external apparatus may be sequentially acquired via the communication I/F 206.

Face data as detection targets of a weak discriminator array in each arm of a branch (to be described below) are those classified based on combinations of divided variation ranges of a variation category to be covered by that branch arm. For example, a weak discriminator array of an arm after the third branch, which corresponds to a classification indicated by a label aB1 in FIG. 5 learns only face images with the same label as detection target data. In arms before the final branch is reached, classifications based on variation categories, which have not been reached yet, are arbitrary, and respective arms cover all variation ranges. For example, a label indicating the cover range of the first branch is one of "a\*\*", "b\*\*", and "c\*\*", and is expressed using asterisks in association with variation categories to be covered by branches which have not started yet. Non-face data as non-detection targets are common to every arms, and do not especially have any labels.

(Learning Sequence with Determination of Minimum Number of Continuous Stages)

FIG. 1 is a flowchart showing an example of a pattern identification unit generation method as characteristic processing of the present invention. In this processing, the numbers of non-branching continuous stages of respective arms of branches in a branch type pattern identification unit are determined. In FIG. 1, weak discriminator generation processes in steps S101, S103, and S107 are equivalent to the basic learning processing method described using FIG. 6.

In step S101, one weak discriminator array before branching is generated. Assume that determination of the completion condition corresponding to step S611 in FIG. 6 in this processing uses the predetermined number of stages, which is determined empirically. Alternatively, a large number of non-face data are used as an evaluation data set, detection processing (FIGS. 7 and 15) is executed every time one stage is generated to check its accumulated abort ratio, and the number of stages until a predetermined non-face accumulated abort ratio is achieved is determined as the predetermined number of stages. The non-face abort ratio for each stage does not always monotonically decrease, as shown in FIG. 24, and after most of non-face data are not aborted, many non-face data may be aborted like in the third and fourth stages in FIG. 24. In such case, when the number of stages is continued to the fourth stage rather than the third stage, the abort efficiency may be improved. Furthermore, a face data abort ratio may be taken into consideration. For example, a face data abort ratio equal to or lower than a predetermined allowable face abort ratio may be added to a continuation condition. This idea can also be used in determination of the number of non-branching continuous stages of each arm after branching, as will be described later.

Upon completion of generation of the weak discriminators for the predetermined number of stages, a branch point is set in step S102. As the first processing in step S102, since the branch structure is as shown in FIG. 3B, three branches corresponding to a, b, and c that divide the variation range of the variation category 501 into three ranges are set.

In step S103, weak discriminator arrays of respective branch arms are generated by the predetermined number of stages. As the predetermined number of stages, when the minimum required number of non-branching continuous stages (the minimum number of continuous stages) is apparently known in advance according to, for example, experience, that number of stages can be set at the first execution after branching. When the number of non-branching continuous stages is unknown, or when this step is executed for the second time or later after branching, one stage is set as the predetermined number of stages. Learning data used in respective branch arms are data having variations a, b, and c indicated by the variation category 501, and include data of all variation ranges in association with variations of the variation categories 502 and 503. The weak discriminator arrays of respective branch arms are considered to be continuous from the weak discriminator before branching from the beginning of the identification unit. At this time, processing corresponding to weighting coefficient initialization in step S602 in FIG. 6 is slightly different from that described above. In this processing, learning data sets for respective branch arms are input to the generated weak discriminator array before branching, and weights obtained by executing the weighting coefficient update processing in step S603 or S610 are set without changing filers or other coefficients in the processing of each stage.

In step S104, the generated weak discriminator arrays of branch arms are evaluated and compared, and it is checked if the minimum required number of stages to be continued is reached. In this embodiment, evaluation is executed using, as parameters for evaluation, an accumulated score shown in FIG. 18.

Figure 18:
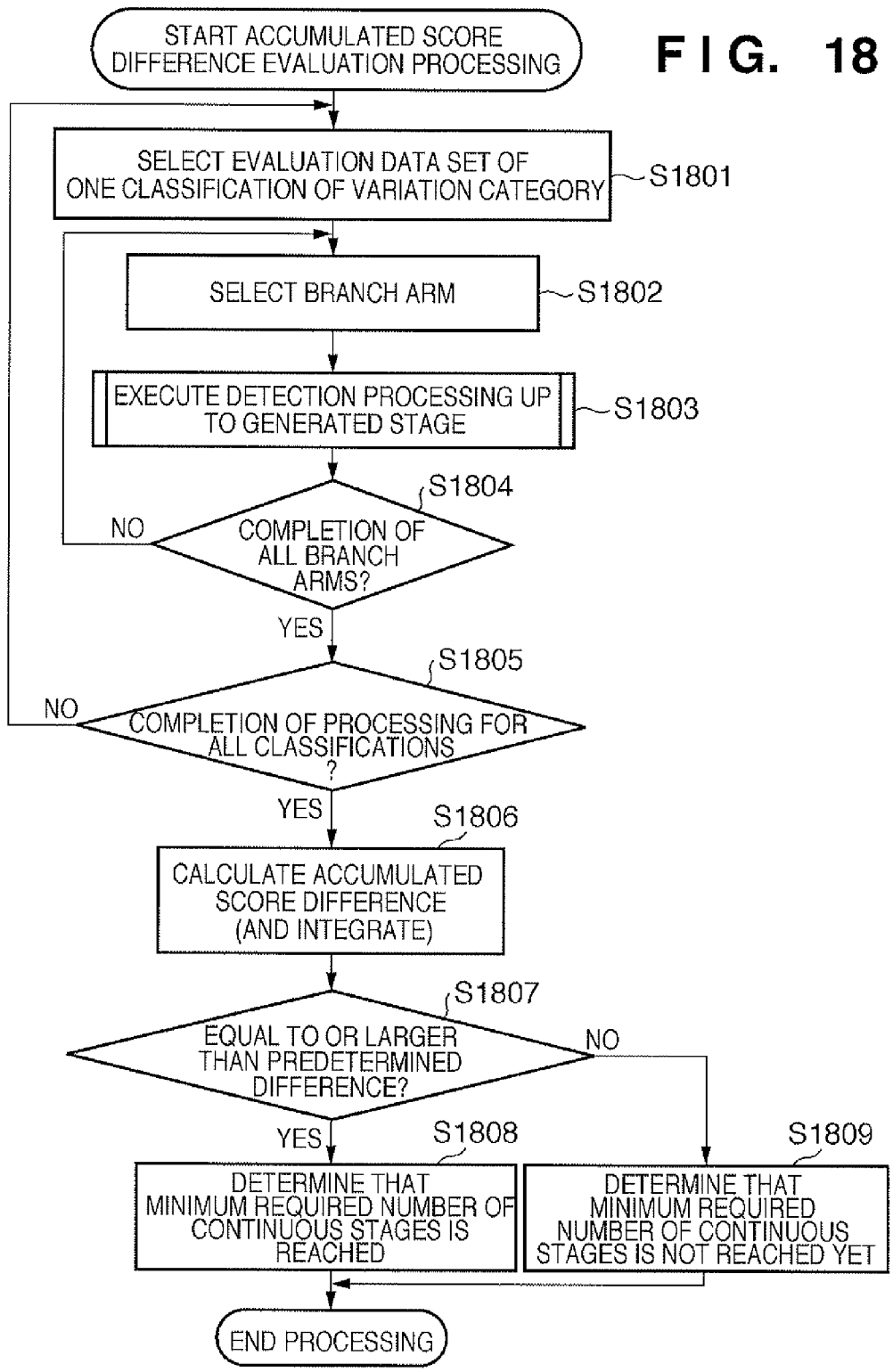
FIG. 18 is a flowchart for explaining details of determination processing of the number of non-branching continuous stages based on accumulated score evaluation according to the first embodiment.

Referring to FIG. 18, in step S1801 one classification (i.e., one of the divided variation ranges) of the variation category corresponding to the branch to be currently evaluated is selected, and data sets having variations classified into that variation range are selected from evaluation data prepared in advance.

For example, as the evaluation processing of the first branch, data groups classified to one of the variation ranges a, b, and c of the variation category 501 are selected as evaluation data sets. These data sets include data of all the variation ranges for the remaining variation categories 502 and 503. Digits that express the variation categories other than the settled variation category of classification labels of such data are described using asterisks like "a" and "b", for the sake of simplicity.

In step S1802, one of branch arms is selected. Each arm is a weak discriminator array which covers one of the variation ranges a, b, and c of the variation category 501.

The evaluation data selected in step S1801 are input to the weak discriminator array of the selected arm, and detection processing is executed in step S1803. This detection processing is executed while considering weak discriminators from the non-branching, first weak discriminator to the generated weak discriminators of the selected arm as one weak discriminator array, and the branch selection processing (step S1512) shown in FIG. 15B is not executed. Only the processing in FIG. 7 is repeated as many as the number of stages of the weak discriminator nodes, and the processes of subsequent stages are not executed if the detection processing is aborted in step S707.

It is checked in step S1804 if execution of the detection processing for the selected evaluation data of the variations is complete for all the branch arms. If execution of the detection processing is not complete yet, the process returns to step S1802 to execute the processing for all the branch arms.

It is checked in step S1805 if the detection processing using the evaluation data of all the classifications associated with the branch in evaluation is complete. If the detection processing using the data of all the classifications is not complete yet, the process returns to step S1801 to select the next classification.

In this way, the detection processing results of all combinations of variation data input to the respective weak discriminator arrays are obtained. For example, in the first branch, nine different detection processing results when data a, b, and c are input to weak discriminator arrays a, b, and c, respectively, are obtained.

Upon completion of the detection processing for all the combinations, accumulated score difference calculation processing is executed in step S1806. This processing calculates average values of accumulated score values upon inputting a certain variation range data set to one branch arm, and compares difference values between the branch arms.

Figure 19A:
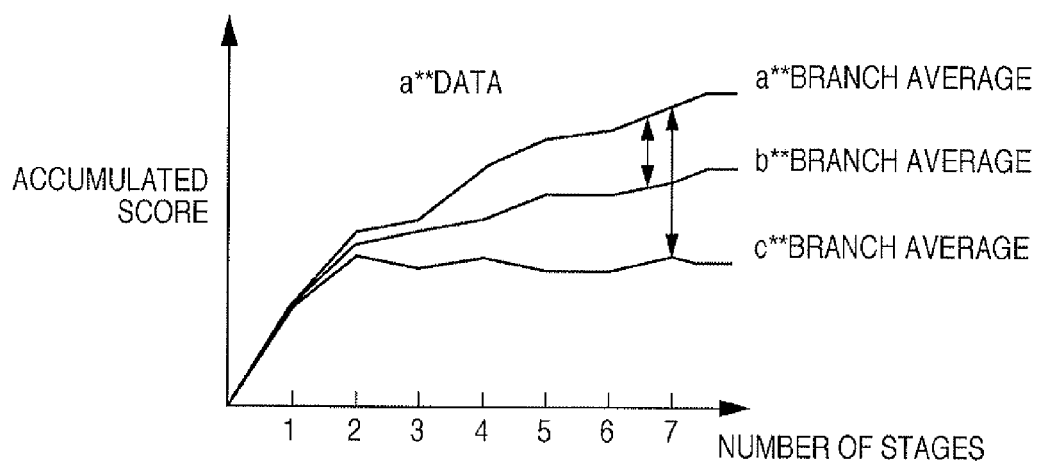
FIGS. 19A and 19B are graphs showing an example of change states of accumulated scores for respective stages of weak discriminators according to the first embodiment.

FIG. 19A shows a transition of accumulated score values for each weak discriminator stage upon inputting an "a" variation data set to three branch arms after the first branch. This example includes only one stage of a non-branching weak discriminator, and the output of the first stage is the same value. The identification unit is divided into three arms from the second stage, and different weak discriminators are generated in the respective arms. As can be seen from FIG. 19A, as the number of processing stages increases, the differences between accumulated scores become gradually larger. Since the "a" variation data set is to be normally detected by the branch arm corresponding to "a", the outputs of an "a" branch are highest. Since "a" is left in-plane rotation, as denoted by reference numeral 501 in FIG. 5, the outputs of a "b" branch that covers a variation range relatively close to "a" are next highest, and a "c" branch outputs lowest accumulated score values.

Figure 19B:
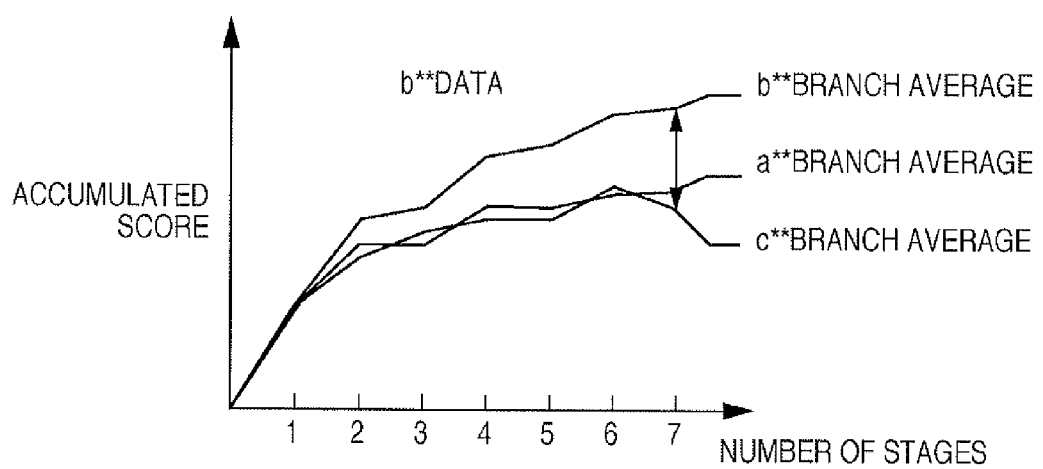

FIG. 19B shows the average accumulated scores and transitions upon inputting the "b" variation data set to the three branch arms. The "b" variation range is equally close to "a\*\*" and "c\*\*" since it indicates a nearly erected in-plane rotation range. Therefore, the "b\*\*" branch which is to originally cover this data set exhibits the highest accumulated score values, and the "a\*\*" and "c\*\*" branches exhibit nearly equal values.

In this manner, in case of a branch having three or more branch arms, processing for calculating differences between the average accumulated score values of these arms, and integrating them is executed in step S1806. As the integration processing, the average of the accumulated score difference values may be calculated, or a minimum value may be selected. When the minimum value is selected, it is expected to improve the branch selectivity, but the number of longer continuous stages is more likely to be required accordingly.

If it is determined in step S1807 that the integrated difference value becomes equal to or larger than a predetermined value, which is set in advance, the number of stages at that time is determined as the minimum required number of continuous stages. The predetermined value may be determined using the difference value itself, but it may be defined by a ratio with respect to the average accumulated score maximum value of a stage to be evaluated more generally.

The branch selection processing upon detection of this embodiment selects an arm to which a node with the highest accumulated score value belongs based on the accumulated score values of respective arms after branching, as has been described above with reference to FIG. 16. Therefore, as the average accumulated score difference with respect to the input evaluation data set becomes larger, it is expected to increase a ratio of correctly selecting a branch arm that covers the corresponding range. An algorithm for determining the number of non-branching continuous stages, which also considers variances in addition to the average accumulated score differences, may be used.

If it is determined in step S1807 that the average accumulated score differences of respective arms become equal to or larger than a predetermined difference (a difference value set in advance), the currently evaluated stages are determined as the minimum required number of stages in step S1808. If the differences are not equal to or larger than the predetermined difference, it is determined in step S1809 that the minimum required number of continuous stages is not reached yet.

Referring back to FIG. 1, it is checked in step S105 if the minimum required number of continuous stages is reached. In practice, the process in this step may be integrated with step S1807, but it is also described in FIG. 1 for the sake of descriptive convenience. If it is determined that the minimum required number of continuous stages is reached (YES in step S105), since the "minimum required" number of non-branching continuous stages is merely determined, the number of stages to be continued in practice is not particularly limited as long as it is equal to or larger than the number of non-branching continuous stages. Therefore, before the process advances to next step S106, weak discriminators for the predetermined number of stages may be additionally generated.

It is checked in step S106 if the next branch schedule still remains. For example, in case of the first processing after the first branch, the process returns to step S102 to restart the processing, so as to execute the second branch next. If the processing until the third branch is complete, and no branch remains, the process advances to step S107.

In step S107, with respect to the generated weak discriminators of the respective branch arms, remaining weak discriminators are generated for the predetermined number of stages or until the predetermined condition is satisfied. The processing ends if generation for all the branches is complete.

As described above, according to the pattern identification unit generation method of this embodiment, since the accumulated score differences of respective arms of a branch with respect to evaluation data of specific variations are evaluated, the minimum required number of non-branching continuous stages required to implement satisfactory branch selection can be determined.

(Second Embodiment)

In the first embodiment, the method of determining the minimum required number of non-branching continuous stages using the difference values of accumulated scores has been explained. In the second embodiment, a method of determining the minimum required number of continuous stages based on selection error ratios of a branch upon inputting evaluation data will be explained.

In this embodiment, in order to avoid a repetitive description with the first embodiment, only differences from the first embodiment will be described. The sequence of the basic processing for advancing learning while evaluating generated weak discriminator arrays of respective branch arms is the same as the first embodiment shown in FIG. 1. In this embodiment, the generated weak discriminator evaluation processing described in step S104 is executed, as shown in FIG. 20.

Figure 20:
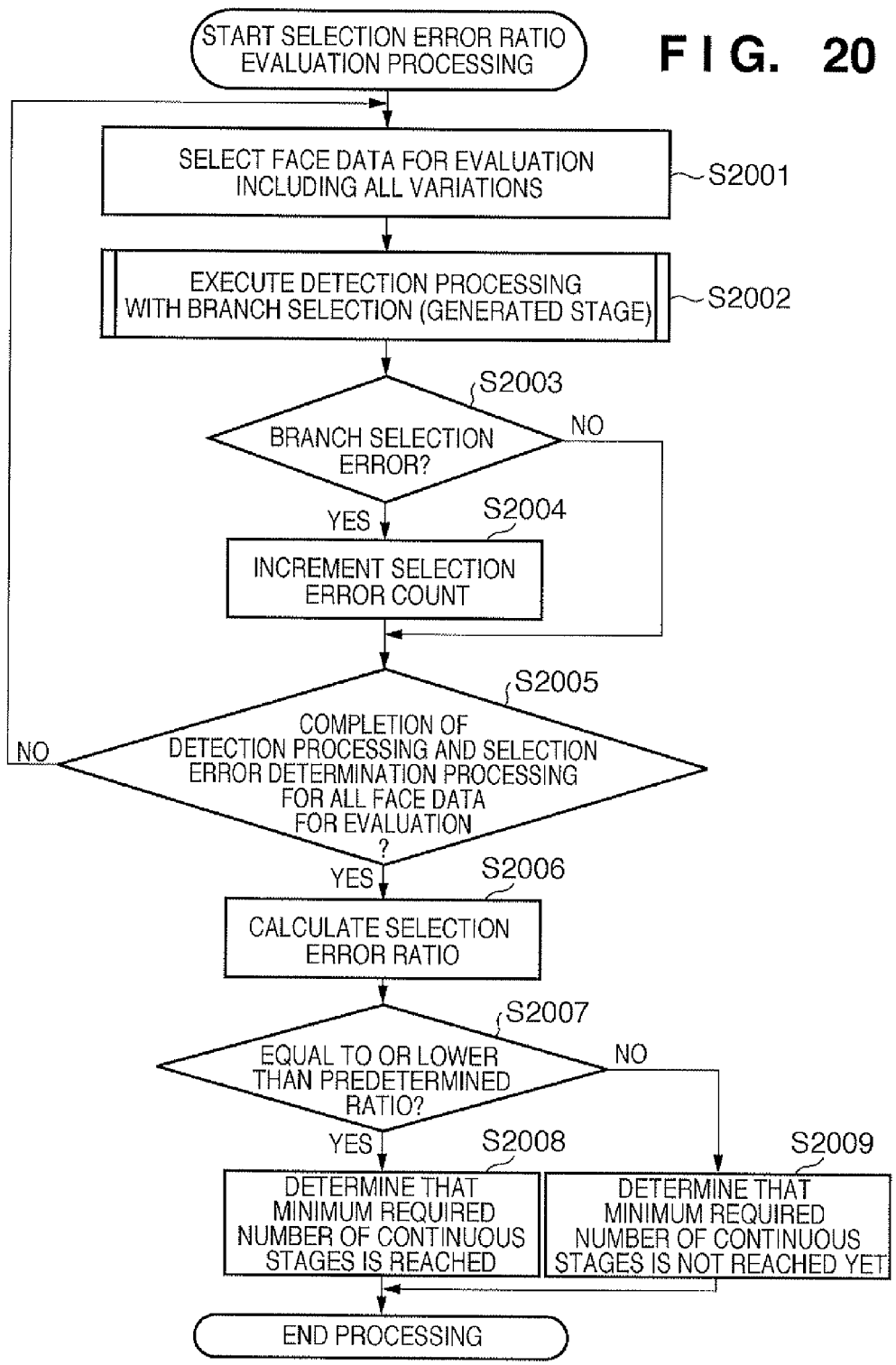
FIG. 20 is a flowchart for explaining details of determination processing of the number of non-branching continuous stages based on selection error ratio evaluation according to the second embodiment.

In the evaluation processing in FIG. 20, as an evaluation data set, a face data group having variations of combinations of classifications of all variation categories associated with a branch to be evaluated is used. Upon evaluating the first branch, a face data group of all the labels is used. Upon evaluating the second branch of an arm with the first branch label "a", a face data group with labels "a\*\*" is used. Note that "\*\*" indicates combinations of all labels of the variation categories 501 and 503. In step S2001, one face data is selected from these evaluation data.

Figure 15A:
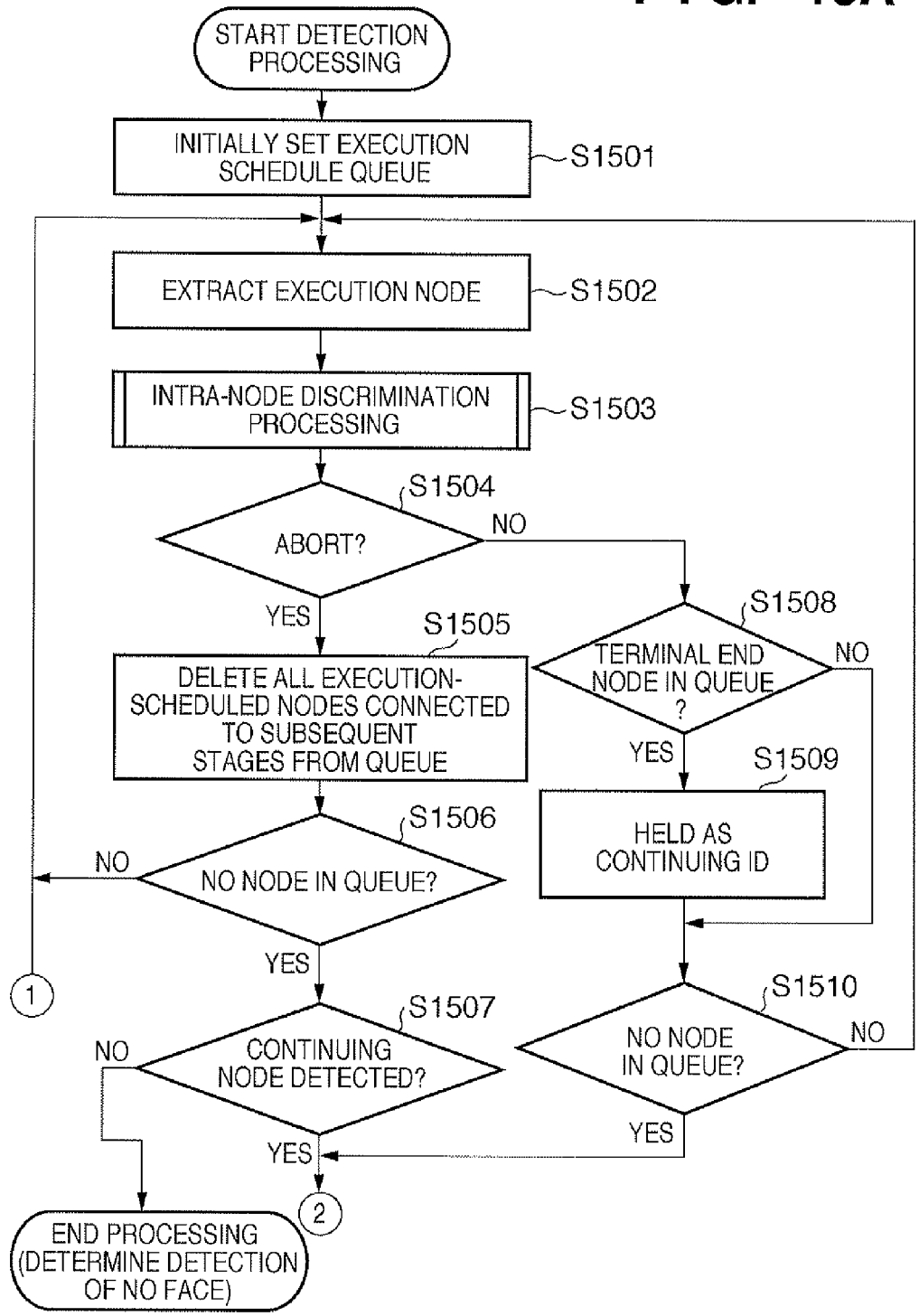
FIGS. 15A and 15B are flowcharts showing the sequence of detection processing with branch selection processing of the pattern identification unit according to the preferred embodiment of the present invention.
Figure 15B:
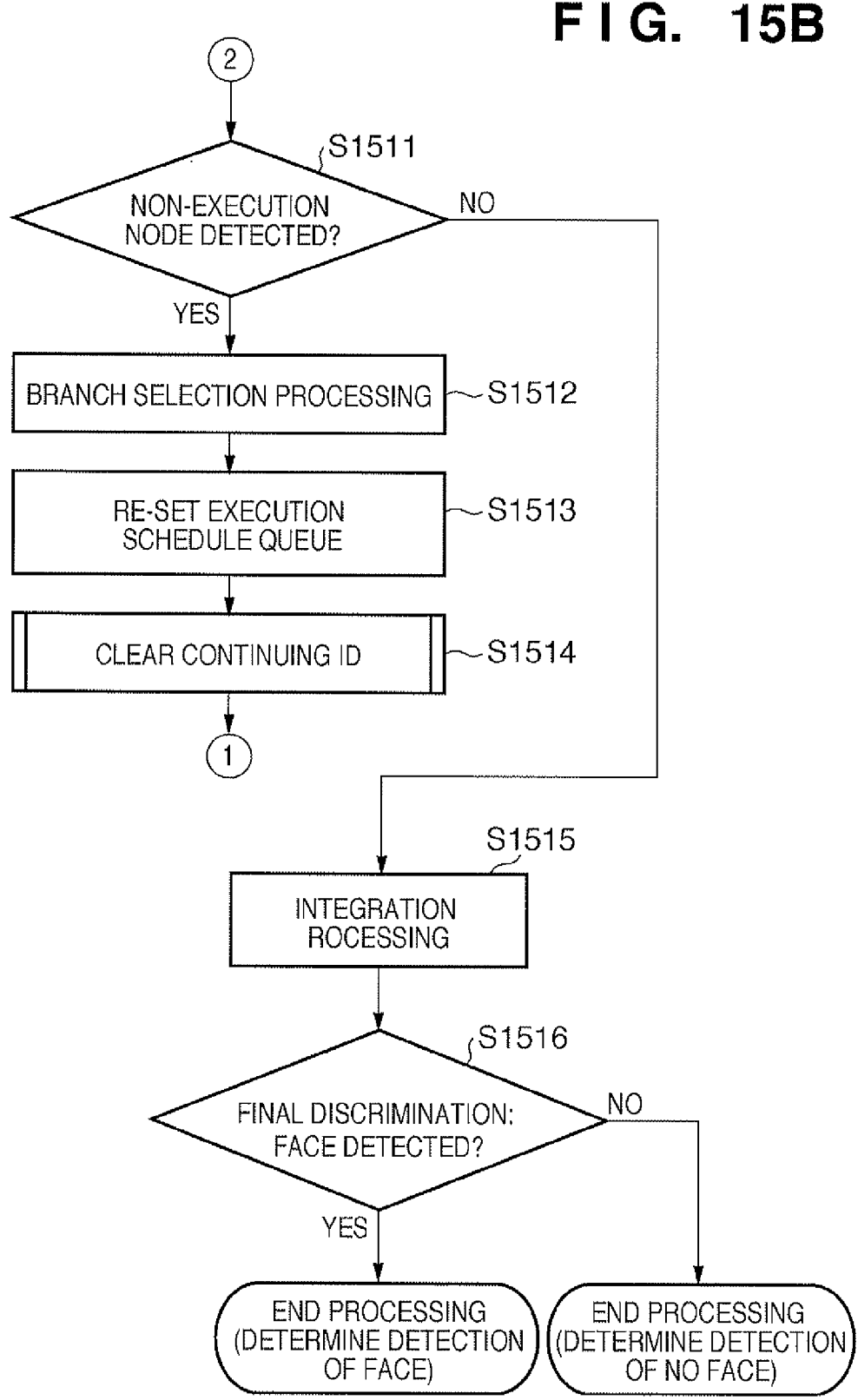

In step S2002, the selected face data is input to a pattern identification unit with a branch structure up to the generated stages, and detection processing with branch selection processing shown in FIGS. 15A, 15B and 16 is executed. As a result, one of arms of a branch in generation is selected. Each evaluation face data is assigned a classification label, as described previously. Also, each branch arm is assigned a classification label to cover. As a result of the selection processing in FIG. 16, if this label matches the digit of a variation category to be evaluated, correct selection is made. It is checked in step S2003 if correct selection is made in the detection processing in step S2002. If selection is incorrect (YES in step S2003), the process advances to step S2004. In step S2004, a selection error count is incremented.

On the other hand, if it is determined in the determination process in step S2003 that branch selection is not an error (NO in step S2003), the process advances to step S2005.

It is checked in step S2005 if the detection processing and selection error determination processing are complete for all data to be evaluated. If data to be evaluated still remain, the process returns to step S2001 to evaluate remaining data.

Upon completion of the processing for all evaluation data, a ratio of selection errors (selection error ratio) is calculated in step S2006. This is the processing for dividing the selection error count by the total number of evaluated data.

It is checked in step S2007 if this error ratio is equal to or smaller than a predetermined value. If the error ratio is equal to or smaller than the predetermined value, it is determined that the generated stages reach the minimum required number of continuous stages (step S2008); otherwise, it is determined that the generated stages do not reach the minimum required number of continuous stages yet (step S2009). The subsequent processes are as have been described in FIG. 1.

Figure 21:
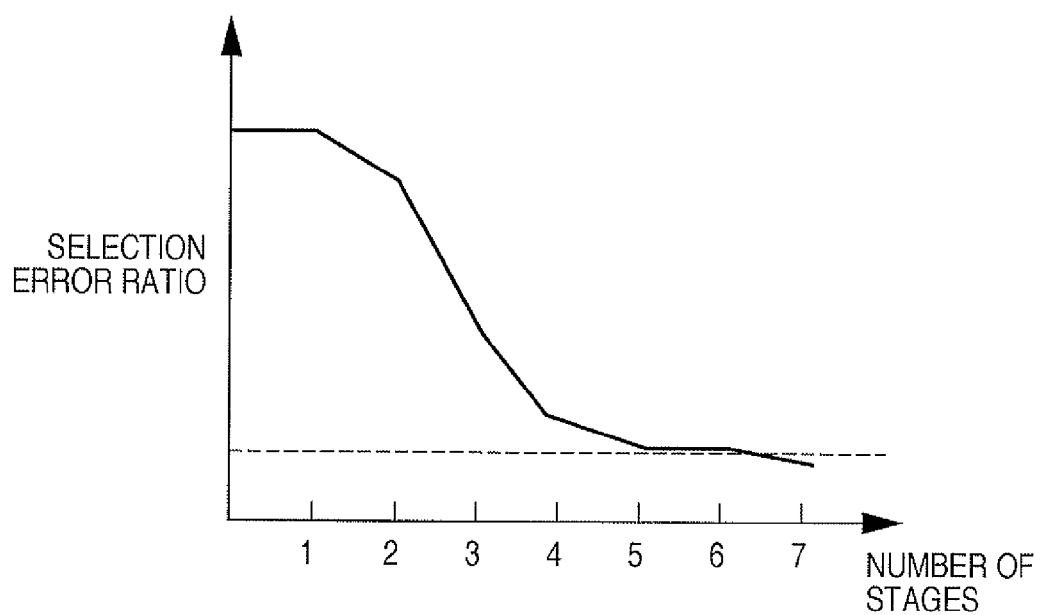
FIG. 21 is a graph showing an example of a change state of a selection error ratio for respective stages of weak discriminators according to the second embodiment.

The selection error ratio is expected to decrease with increasing number of processing stages, as shown in FIG. 21. This is associated with that the accumulated score differences become larger with increasing number of processing stages, as described in the first embodiment.

According to this embodiment, the branch selection processing to be executed upon detection is also executed upon evaluation, and the minimum required number of continuous stages after branching is determined based on the error ratio. Therefore, expected performance can be implemented for a pattern identification unit more directly than the first embodiment. When the selection error ratio does not lower if the number of processing stages is increased, another means (e.g., an upper limit is set for the number of continuous stages) may be used together.

(Third Embodiment)

The first and second embodiments have explained the case in which branch selection is made using accumulated score values in predetermined stages after branching. However, another branch selection method may be used.

Figure 22:
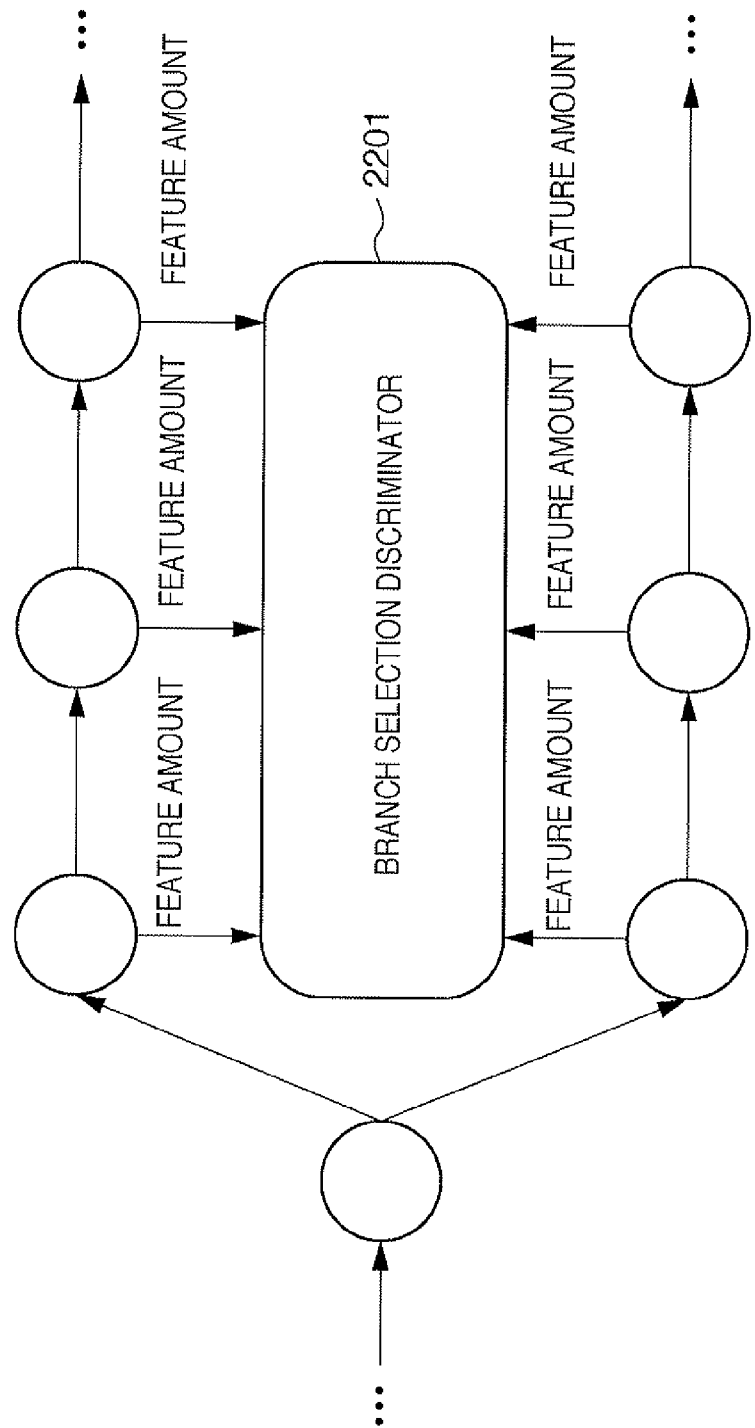
FIG. 22 is a diagram showing an example of a branch selection discriminator according to the third embodiment.

In FIG. 22, reference numeral 2201 denotes a branch selection discriminator in a certain branch. A pattern identification unit selects an arm to be left in each branch based on the branch selection discrimination result output from the branch selection discriminator 2201.

The branch selection discriminator 2201 selects a branch direction to have, as inputs, feature amounts calculated by respective nodes of a weak discriminator array which is to undergo branch selection processing. This discrimination can use known discrimination processing such as linear discrimination analysis, SVM (Support Vector Machine), and the like, and parameters required for these identification methods need to be learned and calculated in advance.

An amount (a feature amount in this embodiment) calculated by normal discrimination processing (FIG. 7) of a weak discriminator node is input to the branch selection discriminator 2201 for branch arm selection, and is not specially calculated for branch selection. Therefore, an overhead required for selection is slight compared to a case in which a new amount which is not related to the processing of a weak discriminator is calculated and is input to the branch selection discriminator 2201.

The value used as an input to the branch selection discriminator 2201 is not limited to a feature amount, but any other values calculated in the discrimination processing in FIG. 7 such as the determination result using a filter threshold, a single score, accumulated score, and the like may be used. The value to be used is held in a memory in association with a node ID.

FIG. 22 shows a case of two branches, but this embodiment can be applied to three or more branches. When a 2-class discriminator such as an SVM as in two branches is used in case of three branches, a method of connecting 2-class discriminators to all combinations two branches out of the three branches, and comparing these scores may be adopted.

Figure 23:
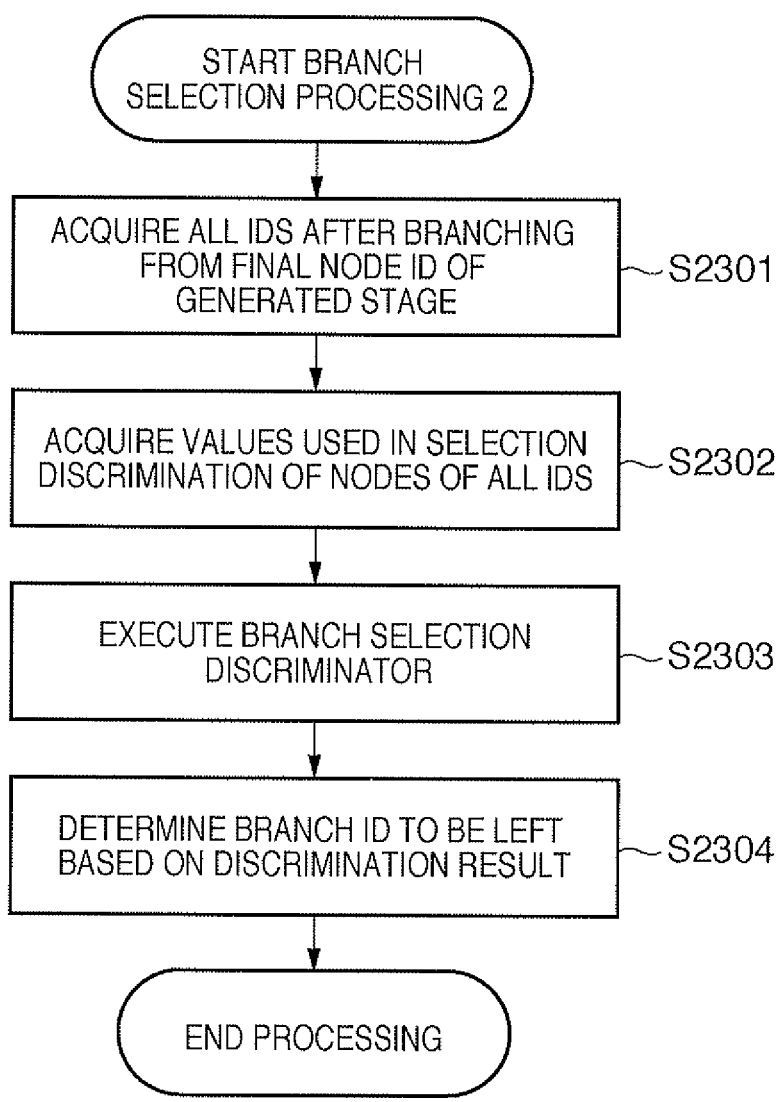
FIG. 23 is a flowchart for explaining details of branch selection processing according to the third embodiment.

The branch selection processing using this branch selection discriminator 2201 is as shown in FIG. 23. In step S2301, all IDs from a node after branching are acquired with reference to bidirectional list areas on a parameter memory in FIGS. 17A and 17B based on the node IDs of the generated final stage of respective branch arms.

In step S2302, values such as feature amounts or the like, which correspond to all the acquired IDs and are used in the branch selection processing, are acquired from a memory. In step S2303, the acquired values are input to the branch selection discriminator 2201 to execute discrimination processing.

In step S2304, the ID of a branch to be selected is determined based on the obtained discrimination result, thus ending the processing.

When the selection error ratio evaluation processing in FIG. 20 is executed using the branch selection processing in FIG. 23, re-learning of the branch selection discriminator 2201 has to be executed prior to evaluation. This is because since the number of feature amounts to be input to the branch selection discriminator 2201 increases every time a weak discriminator for one stage is generated, a discriminator having the number of input dimensions different from the branch selection discriminator 2201 used in previous evaluation is required. Upon learning of the branch selection discriminator 2201, the ID of an input node is acquired from the bidirectional list as in selection. Each data of a learning data set for the branch selection discriminator 2201 undergoes detection processing to obtain a discriminator output of each branch, and learning processing such as a predetermined SVM or the like is executed based on a correct answer label of learning data.

When such branch selection discriminator 2201 is used, branch selection with higher precision can be expected compared to a case in which determination is made using only accumulated score values of the final stage. The branch selection discriminator 2201 can also be applied to the determination processing of the minimum required number of processing stages based on a selection error ratio as in the second embodiment, and it can be expected to obtain a pattern identification unit with higher performance. However, as described above, every time a weak discriminator for one stage is generated, re-learning of the branch selection discriminator 2201 needs to be done, resulting in a long total learning time of the identification unit.

(Other Embodiments)

The aforementioned various processing methods may be applied in combination. For example, as the determination method of the number of continuous stages before the first branch described in the first embodiment, a method using an abort ratio of non-face or face data may be added as one condition upon determination of the number of continuous stages after branching.

Alternatively, the branch selection method using the branch selection discriminator described in the third embodiment may be applied to the pattern identification unit which has learned by determining the number of non-branching continuous stages in the first embodiment. When only the branch selection discriminator learns while fixing parameters of the structure and weak discriminators in the branch structure pattern identification unit which has already learned, the selection precision can be enhanced, thus improving performance.

In the embodiments described so far, only the case in which the number of branches is two or three has been explained. However, the number of branches of the present invention is not limited to this.

In the above embodiments, the evaluation method based on the accumulated score differences, and that based on the selection error ratios have been described. However, the gist of the present invention is not limited to these specific methods. The present invention may be applied to a method of inputting an evaluation data set to a generated weak discriminator array, and determining the number of continuous stages based on the detection processing result. Therefore, the number of continuous stages may be determined based on the detection performance (non-detection ratios, error detection ratios, detection speeds, and the like) of target patterns.

The above embodiments have explained the pattern identification unit which detects human faces included in image data as detection target patterns. However, the application range of the present invention is not limited to this. For example, the present invention can be applied to a pattern identification unit for personal recognition to specify a person included in an input image or to a pattern identification unit for detecting a specific object other than a person.

The present invention is not limited to processing for two-dimensional image data, but can be applied to a pattern identification unit which extracts a specific pattern from one-dimensional data such as audio data or the like or multi-dimensional data (three dimensions or more) including dimensional space elements.

In the above embodiments, the present invention is applied to the method using rectangular filers as weak discriminators. However, the present invention can be applied to various other weak discriminators.

As an example of the learning method of weak discriminators, AdaBoost has been described. However, the present invention is not limited to such specific method. Various other Boosting methods have been proposed, and the present invention includes detectors configured by weak discriminators learned using these methods.

In the above embodiments, the discrimination processing unit 203 is implemented by hardware. However, the present invention can also be applied to software implementation of the discrimination processing unit 203 using a DSP (Digital Signal Processor) or the like. Even in such case, the minimum required number of continuous stages can be calculated by applying the present invention.

In the above embodiments, a pattern identification apparatus which comprises a learning method according to the present invention and can perform intra-apparatus learning has been described. However, an embodiment of the present invention is not limited to this. For example, the present invention can be applied as a pattern identification unit generation system which generates weak discriminators by learning parameter data required to determine the weak discriminators using an external workstation or the like. Furthermore, the application range of the present invention includes a pattern identification unit generation program (computer program) and a storage medium storing the computer program.

Note that the objects of the present invention are also achieved by supplying a computer-readable storage medium, which records a computer program that can implement the functions of the aforementioned embodiments to a system or apparatus. Also, the objects of the present invention are achieved by reading out and executing the computer program stored in the storage medium by a computer (or a CPU or MPU) of the system or apparatus.

In this case, the computer program itself read out from the storage medium implements the functions of the aforementioned embodiments, and the storage medium which stores the program constitutes the present invention.

As the storage medium for supplying the computer program, for example, a flexible disk, hard disk, optical disk, magneto-optical disk, CD-ROM, CD-R, nonvolatile memory card, ROM, and the like may be used.

The computer executes the readout computer program to implement the functions of the aforementioned embodiments. Also, the present invention includes a case in which an OS (operating system) or the like running on the computer executes some or all of actual processing operations on the basis of an instruction of the computer program, thereby implementing the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-326585, filed on Dec. 18, 2007, which is hereby incorporated by reference herein in its entirety.

What is claimed is:

1. A pattern identification unit generation method of generating a pattern identification unit in which a weak discriminator array obtained by cascade-connecting a plurality of weak discriminators branches, and weak discriminator arrays are connected to respective arms after branching, the method comprising:
   an evaluation step of evaluating based on a processing result obtained by inputting a set of evaluation data to the weak discriminator array whether or not a weak discriminator array after branching reaches the number of stages to be connected;
   a determination step of determining, based on an evaluation result in the evaluation step, the number of stages of weak discriminators to be connected without branching as the weak discriminator array after branching.

2. The method according to claim 1, wherein the set of evaluation data includes data classified to a variation category of an image used as a detection target, and
   each arm after branching of the cascade connection corresponds to the classified variation category.

3. The method according to claim 1, wherein each of the weak discriminators calculates a score value as a discrimination result for the input set of evaluation data, and outputs an accumulated score value obtained by adding the calculated score value to an output value output from a weak discriminator of a previous stage to a weak discriminator of a subsequent stage.

4. The method according to claim 3, wherein the set of evaluation data includes data configured by a set of non-detection target patterns, and
   each of the weak discriminators determines to abort processing when the accumulated score value exceeds a predetermined threshold.

5. The method according to claim 3, wherein in the evaluation step, the set of evaluation data is input to the respective weak discriminator arrays after branching, and it is evaluated based on the accumulated score value output from each of the weak discriminators that configure the weak discriminator arrays whether or not each of the weak discriminator arrays reaches the number of stages to be connected.

6. The method according to claim 5, wherein in the determination step, the number of stages when a difference between the accumulated score values in the respective weak discriminator arrays after branching becomes not less than a predetermined value is determined as the number of stages required to connect the weak discriminators without branching based on the evaluation result in the evaluation step.

7. The method according to claim 5, wherein in the determination step, when the number of weak discriminator arrays after branching is not less than three, a difference between the accumulated score values calculated by a combination of the two weak discriminator arrays of all the weak discriminator arrays is calculated, and the number of stages when a value obtained by integrating the differences for all the combinations of the weak discriminator arrays becomes not less than a predetermined value is determined as number of stages required to connect the weak discriminators without branching based on the evaluation result in the evaluation step.

8. The method according to claim 3, further comprising a branch selection step of selecting a branch arm in which processing is to be continued for the set of evaluation data, based on the accumulated score values.

9. The method according to claim 8, wherein in the branch selection step, whether or not a classified variation category matches the set of evaluation data input to the selected branch arm is determined, and a ratio of data which do not match the variation category is calculated as an error ratio.

10. The method according to claim 9, wherein in the evaluation step, whether or not the weak discriminator array in the selected branch arm reaches the number of stages to be connected is evaluated based on the error ratio calculated in the branch selection step.

11. The method according to claim 10, wherein in the determination step, the number of stages when the error ratio becomes not more than a predetermined value is determined as the number of stages required to connect the weak discriminators without branching based on the evaluation result in the evaluation step.

12. An information processing apparatus, which executes a pattern identification unit generation method of generating a pattern identification unit in which a weak discriminator array obtained by cascade-connecting a plurality of weak discriminators branches, and weak discriminator arrays are connected to respective arms after branching, the apparatus comprising:

an evaluation unit adapted to evaluate based on a processing result obtained by inputting a set of evaluation data to the weak discriminator array whether or not a weak discriminator array after branching reaches the number of stages to be connected;

a determination unit adapted to determining, based on an evaluation result of said evaluation unit, the number of stages of weak discriminators to be connected without branching as the weak discriminator array after branching.

13. The apparatus according to claim 12, wherein the set of evaluation data includes data classified to a variation category of an image used as a detection target, and each arm after branching of the cascade connection corresponds to the classified variation category.

14. The apparatus according to claim 12, wherein each of the weak discriminators calculates a score value as a discrimination result for the input set of evaluation data, and outputs an accumulated score value obtained by adding the calculated score value to an output value output from a weak discriminator of a previous stage to a weak discriminator of a subsequent stage.

15. The apparatus according to claim 14, wherein the set of evaluation data includes data configured by a set of non-detection target patterns, and each of the weak discriminators determines to abort processing when the accumulated score value exceeds a predetermined threshold.

16. The apparatus according to claim 14, wherein said evaluation unit inputs the set of evaluation data to the respective weak discriminator arrays after branching, and evaluates based on the accumulated score value output from each of the weak discriminators that configure the weak discriminator arrays whether or not each of the weak discriminator arrays reaches the number of stages to be connected.

17. The apparatus according to claim 16, wherein said determination unit determines the number of stages when a difference between the accumulated score values in the respective weak discriminator arrays after branching becomes not less than a predetermined value as the number of stages required to connect the weak discriminators without branching based on the evaluation result of said evaluation unit.

18. The apparatus according to claim 16, wherein when the number of weak discriminator arrays after branching is not less than three, said determination unit calculates a difference between the accumulated score values calculated by a combination of the two weak discriminator arrays of all the weak discriminator arrays, and determines the number of stages when a value obtained by integrating the differences for all the combinations of the weak discriminator arrays becomes not less than a predetermined value as number of stages required to connect the weak discriminators without branching based on the evaluation result of said evaluation unit.

19. The apparatus according to claim 14, further comprising a branch selection unit adapted to select a branch arm in which processing is to be continued for the set of evaluation data, based on the accumulated score values.

20. The apparatus according to claim 19, wherein said branch selection unit determines whether or not a classified variation category matches the set of evaluation data input to the selected branch arm, and calculates a ratio of data which do not match the variation category as an error ratio.

21. The apparatus according to claim 20, wherein said evaluation unit evaluates whether or not the weak discriminator array in the selected branch arm reaches the number of stages to be connected, based on the error ratio calculated by said branch selection unit.

22. The apparatus according to claim 21, wherein said determination unit determines the number of stages when the error ratio becomes not more than a predetermined value as the number of stages required to connect the weak discriminators without branching based on the evaluation result in said evaluation unit.

23. A non-transitory computer-readable storage medium storing a computer program which makes a computer execute a pattern identification unit generation method according to claim 1.

* * * * *